(12) United States Patent
Ueda

(10) Patent No.: US 9,100,664 B2
(45) Date of Patent: Aug. 4, 2015

(54) IMAGE ENCODING DEVICE, IMAGE DECODING DEVICE, IMAGE ENCODING METHOD, AND IMAGE DECODING METHOD

(75) Inventor: Motoharu Ueda, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 681 days.

(21) Appl. No.: 13/481,440

(22) Filed: May 25, 2012

(65) Prior Publication Data

US 2012/0300840 A1 Nov. 29, 2012

Related U.S. Application Data

(63) Continuation of application No. PCT/JP2010/006853, filed on Nov. 24, 2010.

(30) Foreign Application Priority Data

Nov. 26, 2009 (JP) ................................. 2009-268988

(51) Int. Cl.
*H04N 7/32* (2006.01)
*H04N 19/88* (2014.01)
(Continued)

(52) U.S. Cl.
CPC ............ *H04N 19/88* (2014.11); *H04N 19/105* (2014.11); *H04N 19/176* (2014.11); *H04N 19/197* (2014.11); *H04N 19/46* (2014.11); *H04N 19/51* (2014.11); *H04N 19/52* (2014.11); *H04N 19/593* (2014.11); *H04N 19/61* (2014.11)

(58) Field of Classification Search
CPC .................. H04N 19/00375; H04N 19/00024; H04N 19/00278; H04N 19/00545; H04N 19/00696; H04N 19/00733; H04N 19/00763; H04N 19/00781; H04N 19/00927; H04N 19/105; H04N 19/176; H04N 19/197; H04N 19/46; H04N 19/51; H04N 19/52; H04N 19/593; H04N 19/61; H04N 19/88; H04N 7/362; H04N 19/517; H04N 19/119; H04N 19/00575
USPC ........................................ 375/240.01–240.29
See application file for complete search history.

(56) References Cited

U.S. PATENT DOCUMENTS

2006/0002470 A1* 1/2006 Sakurai .................... 375/240.12
2006/0109904 A1* 5/2006 Hamada .................... 375/240.16
(Continued)

FOREIGN PATENT DOCUMENTS

JP 06-113291 A 4/1994
JP 09-182082 A 7/1997
(Continued)

OTHER PUBLICATIONS

Yu et al., "New Intra Prediction Using Intra-Macroblock Motion Compensation," Joint Video Team (JVT) of ISO/IEC MPEG & ITU-T VCEG (ISO/IEC JTC1/SC29/WG11 and ITU-T SG16 Q.6), JVT-C151, 3rd Meeting: Fairfax, Virginia, USA, May 6, 2002, pp. 1-3.
(Continued)

*Primary Examiner* — Sath V Perungavoor
*Assistant Examiner* — Nathnael Aynalem
(74) *Attorney, Agent, or Firm* — Venable LLP; Michael A. Sartori

(57) ABSTRACT

A disparity vector detection unit retrieves a signal having a high correlation with an encoding target block and acquire the signal having the high correlation and a disparity vector which is a disparity in a screen of the encoding target block by using a local decoded image of a block in the same image signal which was previously encoded, with respect to the encoding target block. A disparity prediction signal generation unit generates a prediction signal in accordance with the disparity vector. The disparity vector detection unit includes a DC calculation unit operative to predict a DC component of an image signal of the encoding target block from a neighboring decoded image, and a disparity reference DC calculation unit operative to calculate a DC component of a prediction signal represented by the disparity vector.

14 Claims, 22 Drawing Sheets

(51) Int. Cl.
*H04N 19/196* (2014.01)
*H04N 19/105* (2014.01)
*H04N 19/52* (2014.01)
*H04N 19/176* (2014.01)
*H04N 19/46* (2014.01)
*H04N 19/51* (2014.01)
*H04N 19/61* (2014.01)
*H04N 19/593* (2014.01)

(56) References Cited

U.S. PATENT DOCUMENTS

| | | | |
|---|---|---|---|
| 2007/0036226 A1* | 2/2007 | Kim et al. | 375/240.24 |
| 2008/0117981 A1* | 5/2008 | Lee et al. | 375/240.24 |
| 2008/0170629 A1* | 7/2008 | Shim et al. | 375/240.29 |
| 2008/0181309 A1* | 7/2008 | Lee et al. | 375/240.16 |
| 2009/0257665 A1* | 10/2009 | Kato et al. | 382/233 |

FOREIGN PATENT DOCUMENTS

| | | |
|---|---|---|
| JP | 2005-159947 A | 6/2005 |
| JP | 2007-043651 A | 2/2007 |

OTHER PUBLICATIONS

Notification of Reasons for Rejection in Japanese Patent Application No. 2009-268988 dated Mar. 26, 2013.

\* cited by examiner

IMAGE ENCODING DEVICE, IMAGE DECODING DEVICE, IMAGE ENCODING METHOD, AND IMAGE DECODING METHOD

BACKGROUND OF THE INVENTION

1. Field of the Invention

The present invention relates to a technique for encoding and decoding an image signal, and more particularly, to an image encoding device, an image decoding device, an encoding method, and an image decoding method using a prediction processing in a screen which generates a prediction signal for an image signal as a target from an encoded image and encodes a differential signal with the prediction signal.

2. Description of the Related Art

In recent years, a service of delivering digitalized image and voice contents via a broadcast wave of a satellite or ground wave or a network has been put to practical use and high-efficiency encoding for efficiently recording information of an image and voice having a large amount of information has bee required. With high definition and diversification of contents, the number of images and the amount of data which are encoded have been further increased and high-efficiency encoding of an advanced image signal of a future content service has been required.

As high-efficiency encoding of an image, a method of compressing the amount of information by using a correlation between pixels which are adjacent spatially in the same frame of a moving image signal and a correlation between frames or fields which are adjacent temporally, which is representative as MPEG2 or MPEG4-AVC (Advanced Video Coding), has been used.

In the MPEG4-AVC (Literature 'ISO/IEC14496-10 Advanced Video Coding'), the image is divided into a plurality of 2D blocks, the prediction signal is generated by using the correlation between the pixels in the same frame or between frames per block, and differential information is encoded together with the prediction signal, thereby implementing high encoding efficiency. Prediction processing using the correlation between the pixels in the same frame in the MPEG4-AVC is called intra-prediction and as illustrated in FIG. 20, a prediction image of a block as an encoding target is generated by using a decoded image of an encoded part adjacent to the target block. In intra-prediction, an adjacent decoding image is encoded together with the prediction mode information by selecting a prediction mode that has a smallest error from the encoding target block from the prediction image generated in a plurality of (9 types when prediction is performed per 4×4 pixel block) prediction modes having a high correlation with respect to a predetermined direction as illustrated in FIG. 20.

The intra-prediction becomes prediction processing using only the correlation with an adjacent area and in the case where the correlation is small on a boundary with the encoding target block, a prediction effect is reduced.

In the image signal, a signal having a similar image component such as a form, a shape, or a background of an object is present, even at a position separated from the target block. Japanese Patent Application Laid-open No. 2005-159947 discloses a method of performing prediction processing by using a correlation with an image at a position separated from a target block. In detail, as illustrated in FIG. 21, an error between an encoded decoding image and the encoding target block is calculated at a position which is shifted by a disparity amount (hereinafter, referred to as a disparity vector) in a screen from the target block, and a reference image referred as the disparity vector having a smallest error is referred to as the prediction image and encoded together with the disparity vector.

In the case where a prediction image having a high correlation over a decode amount of transmitting the disparity vector may be generated, high encoding efficiency can be implemented with respect to the intra-prediction, but in the case where a transmission quantity of the disparity vector is large, sufficient prediction efficiency cannot be achieved.

Japanese Patent Application Laid-open No. 2007-043651 discloses a method of specifying the disparity vector without transmitting the disparity vector in order to reduce the decode amount required for the disparity vector. In Japanese Patent Application Laid-open No. 2007-043651, by using an encoded decoding image adjacent to the target block as a template, an error between the encoded decoding image at a position which is shifted by the disparity vector and the encoded decoding image adjacent to the target block is calculated, a disparity vector having a smallest error is judged as a disparity vector of the encoding target block, and a reference image referred as the disparity vector is referred to as the prediction image. In this method, like the encoding side, in the decoding side, since the disparity vector can be calculated without being received by detecting the disparity vector with the encoded decoding image, the encode amount is not increased due to additional information.

[Patent Document 1] Japanese Patent Application Laid-open No. 2005-159947

[Patent Document 2] Japanese Patent Application Laid-open No. 2007-043651

In MPEG4-AVC, high encoding efficiency can be achieved by performing motion compensation prediction processing based on decoded image signals of different frames in a temporal direction with respect to image signals which are temporally consecutive, but a reference frame to perform motion compensation prediction processing needs to be encoded by using only intra-prediction in the same frame and when a correlation is low on a boundary with an encoding target block, a prediction effect is reduced. Even when a moving-image is not temporally consecutive, the motion compensation prediction is not functioned, and as a result, encoding efficiency is deteriorated by a limit in performance of the intra-prediction.

As presented in Japanese Patent Application Laid-open Nos. 2005-159947 and 2007-043651, a disparity vector from a target block is transmitted or self-generated, such that since prediction using self-similarity of a part other than an adjacent area to an image signal or prediction from different objects having the same texture component is performed when an image correlation at a position separated from the target block is used, self-similarity of an image signal or similarity of a texture cannot be significantly used due to shape disparity or luminance disparity of an object which is present in a screen.

In Japanese Patent Application Laid-open No. 2005-159947, when a prediction signal having an effect to exceed a code amount of the disparity vector cannot be calculated, efficiency deteriorates and in Japanese Patent Application Laid-open No. 2007-043651, since the disparity vector is calculated by using an adjacent image of the encoding target block, a disparity vector having high precision cannot be acquired in the case where a correlation between the adjacent image and the target block is low or a correlation with the adjacent image of a reference block referred as the disparity vector generated in Japanese Patent Application Laid-open No. 2005-159947 is low, and as a result, efficiency is not improved.

SUMMARY OF THE INVENTION

Therefore, an object of the present invention is to implement a prediction method in a frame that can use a correlation of a target block and an image at a position spaced apart therefrom more effectively than a method in the related art in order to significantly improve prediction efficiency in the frame.

An embodiment of the present invention relates to an image encoding device of dividing an image signal into a block constituted by a plurality of pixels and encoding the image signal by the divided block units, including: a disparity vector detection unit operative to retrieve a signal having a high correlation with an encoding target block and acquire the signal having the high correlation and a disparity vector which is a disparity in a screen of the encoding target block by using a local decoded image of a block in the same image signal which was previously encoded, with respect to the encoding target block; and a disparity prediction signal generation unit operative to generate a prediction signal in accordance with the disparity vector, wherein the disparity vector detection unit calculates a signal acquired by inverting a prediction signal designated in the disparity vector in at least one of horizontal and vertical directions and detects an appropriate prediction signal and a disparity vector and information indicating an inversion direction required to configure the prediction signal, from prediction signals including an inverted prediction signal, and the disparity prediction signal generation unit generates the prediction signal from the local decoded image in accordance with the disparity vector and the information indicating the inversion direction and encodes a difference signal between the prediction signal and the encoding target block and the disparity vector and the information indicating the inversion direction.

Another embodiment of the present invention relates to an image encoding device of dividing an image signal into a block constituted by a plurality of pixels and encoding the image signal by the divided block units, including: a neighboring decoding reference disparity vector estimation unit operative to acquire a disparity vector which is a disparity in a screen between the an encoding target block and a prediction signal generated from a local decoded image by using the local decoded image of a block in the same image signal which was previously encoded with respect to the encoding target block; and a neighboring decoding reference disparity prediction signal generation unit operative to generate a prediction signal in accordance with the disparity vector, wherein the neighboring decoding reference disparity vector estimation unit generates the prediction signal and the disparity vector by evaluating an error between signals of adjacent parts of a local decoded image adjacent to the encoding target block and a local decoded image referred as the disparity vector, and generates information indicating an inversion direction by evaluating an error between the local decoded image adjacent to the encoding target block and a signal at a position by inverting the position of the adjacent part of the local decoded image referred as the disparity vector into an arrangement in at least one direction of horizontal and vertical directions based on the local decoded image referred as the disparity vector, and the neighboring decoding reference disparity prediction signal generation unit generates a prediction signal from the local decoded image in accordance with the disparity vector and the information indicating the inversion direction, and encodes a difference signal between the prediction signal and the encoding target block.

Yet another embodiment of the present invention relates to an image encoding device of dividing an image signal into a block constituted by a plurality of pixels and encoding the image signal by the divided block units, including: a disparity vector detection unit operative to retrieve a signal having a high correlation with an encoding target block and acquire the signal having the high correlation and a disparity vector which is a disparity in a screen of the encoding target block by using a local decoded image of a block in the same image signal which was previously encoded with respect to the encoding target block; a disparity prediction signal generation unit operative to generate a prediction signal in accordance with the disparity vector; and a template inversion mode estimation unit operative to estimate information indicating an inversion direction for inverting the prediction signal in at least one direction of horizontal and vertical directions, wherein the template inversion mode estimation unit generates information indicating an inversion direction by evaluating an error between the local decoded image adjacent to the encoding target block and a signal at a position by inverting the position of the adjacent part of the local decoded image referred as the disparity vector into an arrangement in at least one direction of horizontal and vertical directions based on the local decoded image referred as the disparity vector, the disparity vector detection unit calculates a signal acquired by inverting a prediction signal designated in the disparity vector in accordance with the information indicating the inversion direction and detects the disparity vector by evaluating an error between the prediction signal and the encoding target block for each disparity vector, and the disparity prediction signal generation unit generates the prediction signal from the local decoded image in accordance with the disparity vector and the information indicating the inversion direction and encodes a difference signal between the prediction signal and the encoding target block and the disparity vector.

An embodiment of the present invention relates to an image decoding device of dividing an image signal into a block constituted by a plurality of pixels, and receiving and decoding an encoded stream subjected to encoding by the divided block units, including: a disparity vector/mode decoding unit operative to decode a prediction signal generated from a block in the same image signal which was previously decoded with respect to a decoding target block from the encoded stream, a disparity vector which is a disparity in a screen from the decoding target block, and information indicating an inversion direction to invert the decoded image designated in the disparity vector in at least one direction of horizontal and vertical directions; and a disparity prediction signal generation unit operative to generate a prediction signal from the decoded image in accordance with the disparity vector and the information indicating the inversion direction, wherein the decoded image is calculated by adding the prediction signal and a decoded residual signal to each other.

Another embodiment of the present invention relates to an image decoding device of dividing an image signal into a block constituted by a plurality of pixels, and receiving and decoding an encoded stream subjected to encoding by the divided block units, including: a neighboring decoding reference disparity vector estimation unit operative to a disparity vector which is a disparity in a screen between the decoding target block and a prediction signal generated from the decoded image by using a decoded image of a block in the same image signal which was previously decoded with respect to the decoding target block; and a neighboring decoding reference disparity prediction signal generation unit operative to generate a prediction signal in accordance with the disparity vector, wherein the neighboring decoding reference disparity vector estimation unit generates the prediction signal and the disparity vector by evaluating an error between signals of adjacent parts of a decoded image adjacent to the decoding target block and a decoded image referred as the disparity vector, and further, generates information indicating an inversion direction by evaluating an error between the decoded image adjacent to the decoding target block and a signal at a position by inverting the position of the adjacent part of the decoded image referred as the disparity vector into an arrangement in at least one direction of horizontal and vertical directions based on the decoded image referred as the disparity vector, and the neighboring decoding reference disparity prediction signal generation unit generates a prediction signal from the decoded image in accordance with the disparity vector and the information indicating the inversion direction and calculates a decoded image by adding the prediction signal and a decoded residual signal to each other.

Yet another embodiment of the present invention relates to an image decoding device of dividing an image signal into a block constituted by a plurality of pixels, and receiving and decoding an encoded stream subjected to encoding by the divided block units, including: a disparity vector/mode decoding unit operative to decode a prediction signal generated from a block in the same image signal which was previously decoded with respect to a decoding target block and a disparity vector which is a disparity in a screen from the decoding target block; and a template inversion mode estimation unit operative to estimate information indicating an inversion direction for inverting the prediction signal in at least one direction of horizontal and vertical directions, wherein the template inversion mode estimation unit generates information indicating an inversion direction by evaluating an error between the decoded image adjacent to the decoding target block and a signal at a position by inverting the position of the adjacent part of the decoded image referred as the disparity vector into an arrangement in at least one direction of horizontal and vertical directions based on the decoded image referred as the disparity vector; and a disparity prediction signal generation unit operative to generate a prediction signal from the local decoded image in accordance with the disparity vector and the information indicating the inversion direction, wherein the disparity prediction signal generation unit calculates a decoded image by adding the prediction signal and a decoded residual signal to each other.

An embodiment of the present invention relates to an image encoding method of dividing an image signal into a block constituted by a plurality of pixels and encoding the image signal by the divided block units, including: a disparity vector detection step operative to retrieve a signal having a high correlation with an encoding target block and acquire the signal having the high correlation and a disparity vector which is a disparity in a screen of the encoding target block by using a local decoded image of a block in the same image signal which was previously encoded with respect to the encoding target block; and a disparity prediction signal generation step operative to generate a prediction signal in accordance with the disparity vector, wherein in the disparity vector detection step, a signal is calculated by inverting a prediction signal designated in the disparity vector in at least one of horizontal and vertical directions, and an appropriate prediction signal and a disparity vector and information indicating an inversion direction required to configure the prediction signal, from prediction signals including an inverted prediction signal are detected, and in the disparity prediction signal generation step, the prediction signal is generated from the local decoded image in accordance with the disparity vector and the information indicating the inversion direction, and a difference signal between the prediction signal and the encoding target block and the disparity vector and the information indicating the inversion direction are encoded.

Another embodiment of the present invention relates to an image encoding method of dividing an image signal into a block constituted by a plurality of pixels and encoding the image signal by the divided block units, including: a neighboring decoding reference disparity vector estimation step operative to acquire a disparity vector which is a disparity in a screen between the an encoding target block and a prediction signal generated from a local decoded image by using the local decoded image of a block which was previously encoded with respect to the encoding target block; and a neighboring decoding reference disparity prediction signal generation step operative to generate a prediction signal in accordance with the disparity vector, wherein in the neighboring decoding reference disparity vector estimation step, the prediction signal and the disparity vector is generated by evaluating an error between signals of adjacent parts of a local decoded image adjacent to the encoding target block and a local decoded image referred as the disparity vector, and further, information indicating an inversion direction is generated by evaluating an error between the local decoded image adjacent to the encoding target block and a signal at a position by inverting the position of the adjacent part of the local decoded image referred as the disparity vector into an arrangement in at least one direction of horizontal and vertical directions based on the local decoded image referred as the disparity vector, and in the neighboring decoding reference disparity prediction signal generation step, a prediction signal from the local decoded image is generated in accordance with the disparity vector and the information indicating the inversion direction, and a difference signal between the prediction signal and the encoding target block is encoded.

Yet another embodiment of the present invention relates to an image encoding method of dividing an image signal into a block constituted by a plurality of pixels and encoding the image signal by the divided block units, including: a disparity vector detection step operative to retrieve a signal having a high correlation with an encoding target block and acquire the signal having the high correlation and a disparity vector which is a disparity in a screen of the encoding target block by using a local decoded image of a block in the same image signal which was previously encoded with respect to the encoding target block; a disparity prediction signal generation step operative to generate a prediction signal in accordance with the disparity vector; and a template inversion mode estimation step operative to estimate information indicating an inversion direction for inverting the prediction signal in at least one direction of horizontal and vertical directions, wherein in the template inversion mode estimation step, information indicating an inversion direction is generated by evaluating an error between the local decoded image adjacent to the encoding target block and a signal at a position by inverting the position of the adjacent part of the local decoded image referred as the disparity vector into an arrangement in at least one direction of horizontal and vertical directions based on the local decoded image referred as the disparity vector, in the disparity vector detection step, a signal acquired by inverting a prediction signal designated in the disparity vector is calculated in accordance with the information indicating the inversion direction, and the disparity vector is detected by evaluating an error between the prediction signal and the encoding target block for each disparity vector, and in the disparity prediction signal generation step, the prediction signal from the local decoded image is generated in accordance with the disparity vector and the information indicating the inversion direction, and a difference signal between the prediction signal and the encoding target block and the disparity vector and the information indicating the inversion direction is encoded.

An embodiment of the present invention relates to an image decoding method of dividing an image signal into a block constituted by a plurality of pixels, and receiving and decoding an encoded stream subjected to encoding by the divided block units, including: a disparity vector/mode decoding step operative to decode a prediction signal generated from a decoded image of a block in the same image signal which was previously decoded with respect to a decoding target block from the encoded stream, a disparity vector which is a disparity in a screen from the decoding target block, and information indicating an inversion direction to invert the decoded image designated in the disparity vector in at least one direction of horizontal and vertical directions; and a disparity prediction signal generation step operative to generate a prediction signal from the decoded image in accordance with the disparity vector and the information indicating the inversion direction, wherein the decoded image is calculated by adding the prediction signal and a decoded residual signal to each other.

Another embodiment of the present invention relates to an image decoding method of dividing an image signal into a block constituted by a plurality of pixels, and receiving and decoding an encoded stream subjected to encoding by the divided block units, including: a neighboring decoding reference disparity vector estimation step operative to acquire a disparity vector which is a disparity in a screen between the decoding target block and a prediction signal generated from the decoded image by using a decoded image of a block in the same image signal which was previously decoded with respect to the decoding target block; and a neighboring decoding reference disparity prediction signal generation step operative to generate a prediction signal in accordance with the disparity vector, wherein in the neighboring decoding reference disparity vector estimation step, the prediction signal and the disparity vector are generated by evaluating an error between signals of adjacent parts of a decoded image adjacent to the decoding target block and a decoded image referred as the disparity vector, and further, information indicating an inversion direction is generated by evaluating an error between the decoded image adjacent to the decoding target block and a signal at a position by inverting the position of the adjacent part of the decoded image referred as the disparity vector into an arrangement in at least one direction of horizontal and vertical directions based on the decoded image referred as the disparity vector, and in the neighboring decoding reference disparity prediction signal generation step, a prediction signal is generated from the decoded image in accordance with the disparity vector and the information indicating the inversion direction, and a decoded image is calculated by adding the prediction signal and a decoded residual signal to each other.

Yet another embodiment of the present invention relates to an image decoding method of dividing an image signal into a block constituted by a plurality of pixels, and receiving and decoding an encoded stream subjected to encoding by the divided block units, including: a disparity vector/mode decoding step operative to decode a prediction signal generated from a block in the same image signal which was previously decoded with respect to a decoding target block and a disparity vector which is a disparity in a screen from the decoding target block; a template inversion mode estimation step operative to estimate information indicating an inversion direction for inverting the prediction signal in at least one direction of horizontal and vertical directions; and wherein in the template inversion mode estimation step, information indicating an inversion direction is generated by evaluating an error between the decoded image adjacent to the decoding target block and a signal at a position by inverting the position of the adjacent part of the decoded image referred as the disparity vector into an arrangement in at least one direction of horizontal and vertical directions based on the decoded image referred as the disparity vector; and a disparity prediction signal generation step operative to generate a prediction signal from the local decoded image in accordance with the disparity vector and the information indicating the inversion direction, wherein in the disparity prediction signal generation step, a decoded image is calculated by adding the prediction signal and a decoded residual signal to each other.

In the image encoding device, the image decoding device, the image encoding method, and the image decoding method according to the present invention, a reference image vertically or horizontally inversed with respect to the encoded decoding image, which is used as the template signal for predicting the texture component, is generated and used as the prediction image, such that the precision of the image signal in the frame in the related art can be improved. A prediction inversion mode is generated by using the correlation of the inversion mode with the adjacent block and the correlation of the disparity vector in regard to the inversion mode, such that additional information can be implemented in a small amount. By configuring the image encoding device, the image decoding device, the image encoding method, and the image decoding method that perform the prediction processing using the effects, encoding efficiency can be improved.

DESCRIPTION OF THE EMBODIMENTS

Hereinafter, embodiments of the present invention will be described with reference to the accompanying drawings.

First Embodiment

First, forms of an image encoding device and an image decoding device according to a first embodiment of the present invention will be described.

Figure 1:
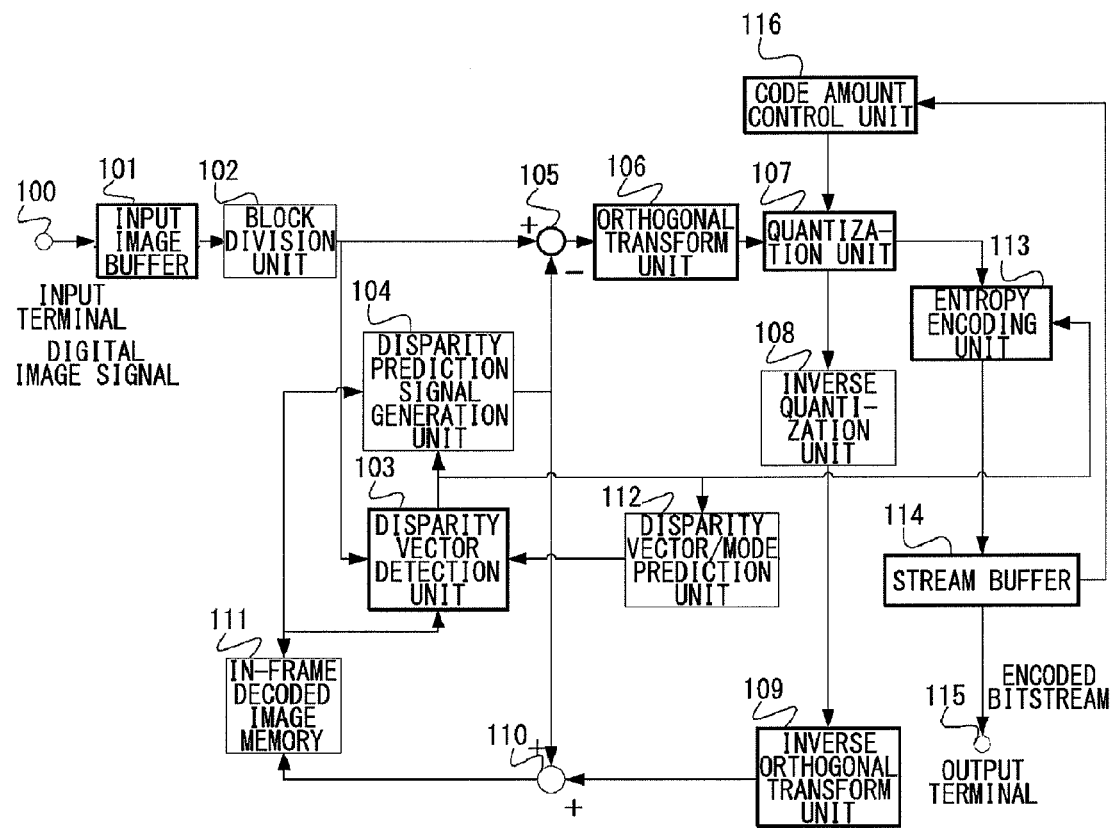
FIG. 1 is a configuration diagram illustrating an image encoding device according to a first embodiment of the present invention.

FIG. 1 is a configuration diagram illustrating a form of an image encoding device according to a first embodiment of the present invention. As illustrated in FIG. 1, the image encoding device according to the embodiment includes an input terminal 100, an input image buffer 101, a block division unit 102, a disparity vector detection unit 103, a disparity prediction signal generation unit 104, a subtractor 105, an orthogonal transform unit 106, a quantization unit 107, an inverse quantization unit 108, an inverse orthogonal transform unit 109, an adder 110, an in-frame decoded image memory 111, a disparity vector/mode prediction unit 112, an entropy encoding unit 113, a stream buffer 114, an output terminal 115, and a code amount control unit 116.

The disparity vector detection unit 103, the disparity prediction signal generation unit 104, and the disparity vector/mode prediction unit 112 which are installed and operations of the units in a processing block are features in the first embodiment of the present invention, and other processing blocks become processing blocks constituting in-frame encoding processing in the image encoding device such as MPEG4-AVC, and the like.

A digital image signal inputted from the input terminal 100 is received in the input image buffer 101. The digital image signal received in the input image buffer 101 is supplied to the block division unit 102 and segmented as an encoding target block per 2D macro block constituted by 16×16 pixels. The block division unit 102 supplies the segmented encoding target block to the disparity vector detection unit 103 and the subtractor 105. The subtractor 105 calculates a difference between the encoding target block supplied from the input image buffer 101 and a prediction image block supplied from the disparity prediction signal generation unit 104, which will be described below and supplies the calculation result to the orthogonal transform unit 106 as a difference block.

The orthogonal transform unit 106 DCT-transforms the difference block per 8 horizontal pixels×8 vertical pixels to generate a DCT coefficient corresponding to an orthogonally transformed frequency component signal. The orthogonal transform unit 106 collects the generated DCT coefficient per 2D macro block and outputs the collected DCT coefficient to the quantization unit 107. The quantization unit 107 performs quantization processing by dividing the DCT coefficient by difference values for each frequency component. The quantization unit 107 supplies the quantized DCT coefficient to the inverse quantization unit 108 and the entropy encoding unit 113. The inverse quantization unit 108 multiplies the quantized DCT coefficient inputted from the quantization unit 107 by the divided value in quantization to perform inverse quantization and outputs the inverse quantized result to the inverse conversion unit 109 as the decoded DCT coefficient. The inverse orthogonal transform unit 109 performs inverse DCT processing and generates a decoded difference block. The inverse orthogonal transform unit 109 supplies the decoded difference block to the adder 110. The adder 110 adds the prediction image block supplied from the disparity prediction signal generation unit 104 and the decoded difference block supplied from the inverse orthogonal transform unit 109, and generates a local decoded block. The local decoded block generated by the adder 110 is received in the in-frame decoded image memory 111 in an inversely block-converted form.

The disparity vector detection unit 103 calculates the disparity vector and a mode (hereafter, referred to as an inversion mode) to instruct inversion of the decoded image between the image signal of the encoding target block inputted from the block division unit 102 and the decoded image signal received in the in-frame decoded image memory 111. The disparity vector detection unit 103 receives prediction values of the disparity vector and the inversion mode for the target block, which are supplied from the disparity vector/mode prediction unit 112 and performs disparity vector detection processing. A detailed operation of the disparity vector detection unit 103 will be described below.

The disparity vector detection unit 103 outputs the detected disparity vector value and the inversion mode value to the disparity prediction signal generation unit 104 and the disparity vector/mode prediction unit 112 and difference information from the prediction values of the respective disparity vector and inversion mode to the entropy encoding unit 113. The disparity prediction signal generation unit 104 generates a prediction image from the in-frame decoded image memory 111 based on the disparity vector value and the inversion mode value inputted from the disparity vector detection unit 103 and outputs the generated prediction image to the adder 105 and the subtractor 110. A detailed operation of the disparity prediction signal generation unit 104 will be described below.

The disparity vector/mode prediction unit 112 serves to store the disparity vector value and the inversion mode value inputted from the disparity vector detection unit 103 and generate disparity vector values and inversion mode values of subsequent encoding target blocks. A detailed operation of the disparity vector/mode prediction unit 112 will be described below.

The entropy encoding unit 113 performs variable-length encoding of disparity vector information and inversion mode information, and the quantized DCT coefficient by using the quantized DCT coefficient supplied from the quantization unit 107 and a predicted difference value of the disparity vector value and the inversion mode value supplied from the disparity vector detection unit 103. The information subjected to variable-length encoding is outputted to the stream buffer 114.

An encoded stream accumulated in the stream buffer 114 is outputted to a recording medium or a transmission path through the output terminal 115. In regard to a control of a code amount of the encoded stream, the code amount of a bitstream accumulated in the stream buffer 114 is supplied to the code amount control unit 116 and the supplied code amount is compared with a target code amount, such that the supplied code amount is close to the target code amount by controlling minuteness of quantization (quantization scale) of the quantization unit 107.

Subsequently, a form of an image decoding device that decodes the encoded bitstream generated by the image encoding device according to the first embodiment of the present invention will be described.

Figure 2:
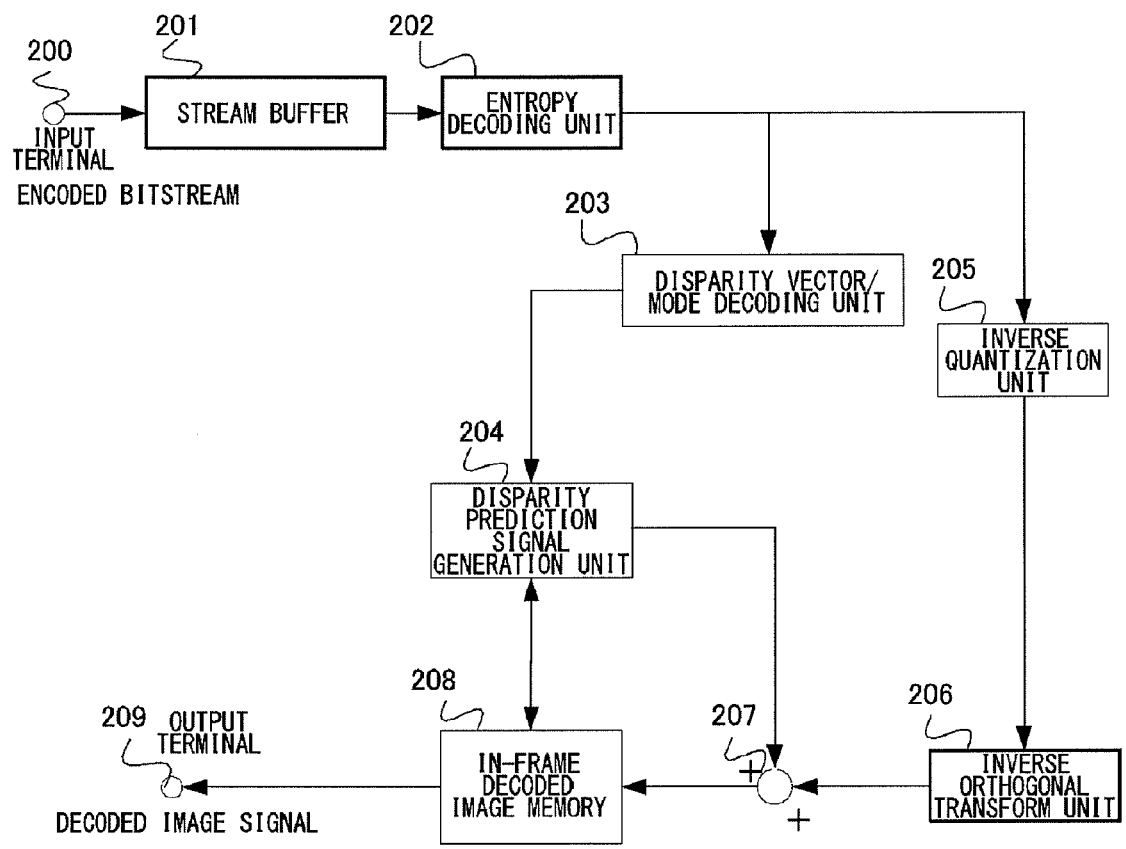
FIG. 2 is a configuration diagram illustrating an image decoding device according to the first embodiment of the present invention.

FIG. 2 is a configuration diagram illustrating a form of an image encoding device according to the first embodiment of the present invention. As illustrated in FIG. 2, the image decoding device of the embodiment includes an input terminal 200, a stream buffer 201, an entropy decoding unit 202, a disparity vector/mode decoding unit 203, a disparity prediction signal generation unit 204, an inverse quantization unit 205, an inverse orthogonal transform unit 206, an adder 207, an in-frame decoded image memory 208, and an output terminal 209.

The disparity vector/mode decoding unit 203 and the disparity prediction signal generation unit 204 which are installed and operations of the sections in a processing block are features in the first embodiment of the present invention, and other processing blocks become processing blocks constituting in-frame decoding processing in the image encoding device such as MPEG4-AVC, and the like.

The encoded bitstream inputted from the input terminal 200 is received in the stream buffer 201. The received encoded bitstream is supplied from the stream buffer 201 to the entropy decoding unit 202, the entropy decoding unit 202 performs variable-length decoding of encoded disparity vector difference information and inversion mode difference information, and the quantized DCT coefficient from the inputted bitstream, and outputs the quantized DCT coefficient to the inverse quantization unit 205 and the disparity vector difference information and the inversion difference information to the disparity vector/mode decoding unit 203. The inverse quantization unit 205, the inverse orthogonal transform unit 206, the adder 207, and the in-frame decoded image memory 208 perform the same processing as the local decoding processing of a moving image encoding device according to the first embodiment. The decoded image accumulated in the in-frame decoded image memory 208 is displayed on a display apparatus through the output terminal 209 as the decoded image signal.

The disparity vector/mode decoding unit 203 calculates the disparity vector prediction value and the inversion mode prediction value from the disparity vector difference information and the inversion mode difference information which are inputted from the entropy decoding unit 202 and the disparity vector value and the inversion mode value of the previously decoded target block, and adds the calculated disparity vector prediction value and inversion mode prediction value to the disparity vector difference information and inversion mode difference information to decode the disparity vector value and the inversion mode value of the encoding target block and output the decoded disparity vector value and inversion mode value to the disparity prediction signal generation unit 204. A detailed operation of the disparity vector/mode prediction unit 203 will be described below.

The disparity prediction signal generation unit 204 generates a prediction image from the in-frame decoded image memory 208 based on the disparity vector value and the inversion mode value outputted from the disparity vector/mode decoding unit 203 and outputs the generated prediction image to the adder 207. A detailed operation of the disparity prediction signal generation unit 204 will be described below.

A disparity prediction method in the screen of the present invention will be described by using FIG. 3. A viewpoint of the present invention in the first embodiment is that a block in which a reference image is inversed vertically and horizontally is added as a prediction target signal and encoded together with the inversion mode to generate a prediction block having the higher correlation with an encoding block, in order to more sufficiently use self-similarity of the image signal or similarity of a texture than the related art.

Figure 3:
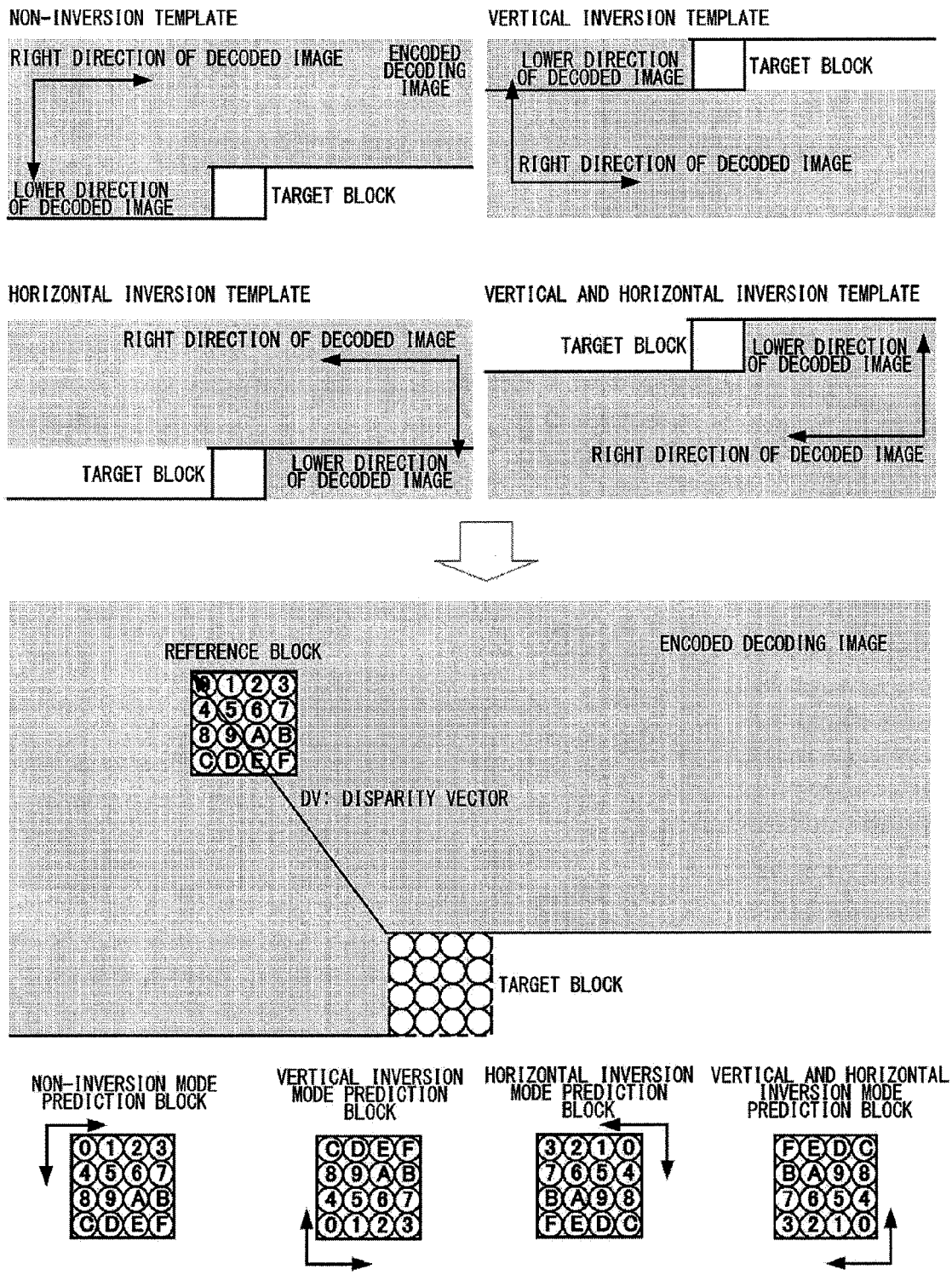
FIG. 3 is a conceptual diagram illustrating disparity prediction within a screen of the present invention.

In an upper part of FIG. 3, a template which is not inverted is a reference image (an encoded decoding image) used for prediction using calculation of the disparity vector in the screen in the related art. An image diagram in which the reference image acquired by vertically, horizontally, and both vertically and horizontally inverting the decoded image is placed based on an upper left pixel of the target block is displayed as a vertically inverted template, a horizontally inverted template, and a vertically and horizontally inverted template.

In detail, calculation of the disparity vector and the generation of the prediction image block for the reference image may be achieved by acquiring a reference block from the encoded decoding image which moves to a position represented by the disparity vector based on the target block and then vertically, horizontally, and both vertically and horizontally inverting the reference block. A non-inversion mode prediction block, a vertical inversion mode prediction block, a horizontal inversion mode prediction block, and a vertical and horizontal inversion mode prediction block illustrated in a lower part of FIG. 3 become prediction block signals of the respective inversion modes referred by a disparity vector DV.

When the disparity vector is calculated, a pixel as an evaluation target of a prediction error is acquired at vertical, horizontal, and both vertical and horizontal inversion positions to evaluate the prediction error, such that the template serving as a reference candidate is generated without increasing the amount of data acquired from the decoded image and increasing calculation in image conversion such as filter processing and the like.

Figure 4:
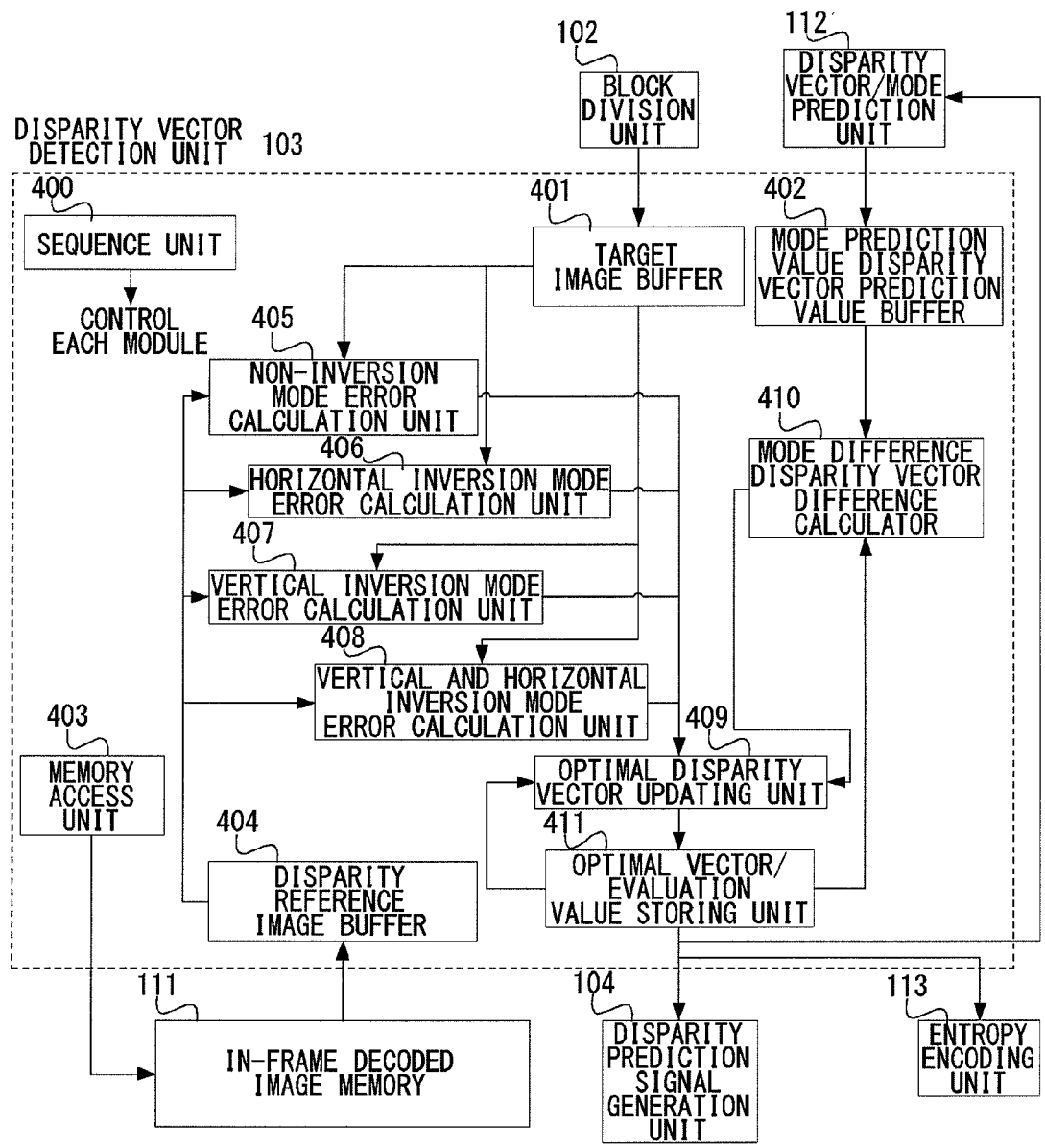
FIG. 4 is a configuration diagram illustrating a disparity vector detection unit according to the first embodiment of the present invention.

The disparity vector detection unit 103 in FIG. 1 serves to calculate the disparity vector and the inversion mode as illustrated in FIG. 3 and the configuration diagram thereof is illustrated in FIG. 4 and will be described.

The disparity vector detection unit 103 includes a sequence unit 400, a target image buffer 401, a mode prediction value disparity vector prediction value buffer 402, a memory access unit 403, a disparity reference image buffer 404, a non-inversion mode error calculator 405, a horizontal inversion mode error calculator 406, a vertical inversion mode error calculator 407, a vertical and horizontal inversion mode error calculator 408, an optimal disparity vector updating unit 409, a mode difference disparity vector difference calculator 410, and an optimal vector/evaluation value storing unit 411, as illustrated in FIG. 4.

An encoding target block is inputted and received from the block division unit 102 into the target image buffer 401. The memory access unit 403 acquires the reference block together with the disparity vector value, which is managed by the sequence unit 400, from the in-frame decoded image memory and stores the acquired reference block in the disparity reference image buffer 404.

Horizontal image signals are supplied sequentially to a lower part from an upper part of the target block from the target image buffer 401 to the non-inversion mode error calculator 405 and the horizontal inversion mode error calculator 406. Simultaneously, the horizontal image signals are supplied sequentially to the upper part from the lower part of the target block from the target image buffer 401 to the vertical inversion mode error calculator 407 and the vertical and horizontal inversion mode error calculator 408.

Meanwhile, horizontal reference image signals are supplied sequentially to a lower part from an upper part of the reference block, from the disparity reference image buffer 404 to the non-inversion mode error calculator 405, the horizontal inversion mode error calculator 406, the vertical inversion mode error calculator 407, and the vertical and horizontal inversion mode error calculator 408.

The non-inversion mode error calculator 405 and the vertical inversion mode error calculator 407 serve to calculate a square-difference of horizontal image signals of an inputted target image and a reference image at the same horizontal position and store the sum thereof.

The horizontal inversion mode error calculator 406 and the vertical inversion mode error calculator 407 serve to calculate a square-error of images at a bilateral symmetric position with respect to the horizontal image signals of the inputted target image and the reference image and store the sum thereof.

Therefore, prediction error evaluation values of the non-inversion mode prediction block, the vertical inversion mode prediction block, the horizontal inversion mode prediction block, and the vertical and horizontal inversion mode prediction block illustrated in FIG. 3 are generated.

The non-inversion mode error calculator 405, the horizontal inversion mode error calculator 406, the vertical inversion mode error calculator 407, and the vertical and horizontal inversion mode error calculator 408 output a block sum of respective calculated square error values to the optimal disparity vector updating unit 409.

A disparity vector prediction value and an inversion mode prediction value supplied from the mode prediction value disparity vector prediction value buffer are added to the disparity vector value managed by the sequence unit 400 in the mode difference disparity vector difference calculator 410, and a prediction difference value and a disparity vector difference value for each inversion mode are calculated to be outputted to the optimal disparity vector updating unit 409.

The optimal disparity vector updating unit 409 compares a minimum error evaluation value for the same encoding target block with an error evaluation value (a sum of square errors) of the respective inversion modes in the disparity vector value managed by the sequence unit 400, updates inversion mode and disparity vector having a smallest evaluation value as an optimal disparity vector, and outputs the optimal disparity vector to the optimal vector/evaluation value storing unit 411 together with the evaluation values and the prediction difference value and the disparity vector difference value for each selected inversion mode.

After an error for a disparity vector value in a retrieval range managed by the sequence unit 400 is evaluated, the optimal vector/evaluation value storing unit 411 outputs the received inversion mode and disparity vector to the disparity prediction signal generation unit 104 and the disparity vector/mode prediction unit 112 and outputs the prediction difference value and disparity vector difference value for each inversion mode to the entropy encoding unit 113.

Figure 5:
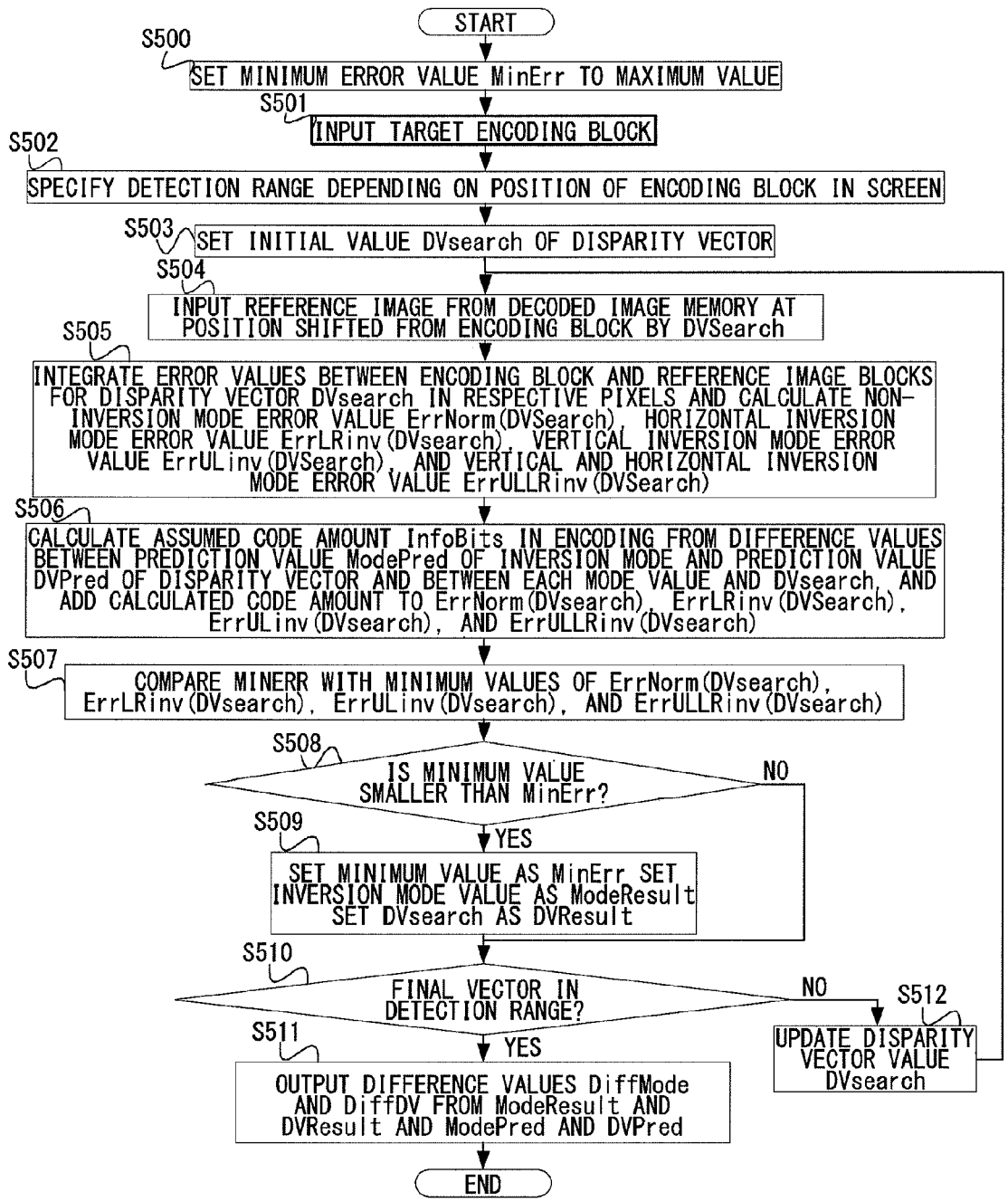
FIG. 5 is a flowchart illustrating a detection operation of a disparity vector according to the first embodiment of the present invention.

A sequence as calculation processing of the detection processing is illustrated through a flowchart in FIG. 5 and a processing sequence managed by the sequence unit 400 will be described.

In step S500, a minimum error value MinErr is firstly set to a maximum value (for example, 0xffffffff in the case where a storage area is 32 bits) with respect to the target encoding block. In step S501, the target encoding block is inputted. In step S502, a detection range of the disparity vector is set depending on the position of the encoding block in the screen. Herein, the detection range is limited so that the set disparity vector detection range is not over an encoded area in the screen. In step S503, an initial value DVSearch of the disparity vector is set based on the limited detection range. As one example, a value which is approximate to the encoding target block (having the small disparity vector) is set within the detection range. In step S504, the reference image block is inputted from a decoded image memory which is shifted from the encoding block by the DVSearch with respect to the set DVSearch.

In step S505, error values of the encoding block and the reference image block for the disparity vector DVSearch in respective pixels are integrated by using the reference image block and the encoding target block, and a non-inversion mode error value ErrNorm(DVSearch), a horizontal inversion mode error value ErrLRinv(DVSearch), a vertical inversion mode error value ErrULinv(DVSearch), and a vertical and horizontal inversion mode error value ErrULLRinv(DVSearch) are calculated.

Difference values DiffMode, DiffDV between a prediction value ModePred of the inversion mode and a prediction value DVPred of the disparity vector and each mode value and DVSearch are calculated and an assumed code amount InfoBits in encoding is calculated. In step S506, InfoBits calculated with the respective inversion modes are added to ErrNorm(DVSearch), ErrLRinv(DVSearch), ErrULinv(DVSearch), and ErrULLRinv(DVSearch).

In regard to the inversion mode, the mode value may correspond as follows so that an inversion direction is one in the case where the prediction mode is over 1.

Non-inversion mode: 0
Vertical inversion mode: 1
Vertical and horizontal inversion mode: 2
Horizontal inversion mode: 3

2 bits are acquired by adding the difference of the inversion mode to the prediction value ModePred to display the inversion mode. For example, ModePred of 1 is transmitted to the horizontal inversion mode (=3), in the case where the inversion mode is the non-inversion mode. When the inversion mode is decreased by 1, 3 is actually transmitted. In the case where the prediction mode is appropriately predicted, a lot of approximate inversion modes are present and 0 is encoded with a small code amount to encode the inversion mode with a small amount of information. For example, the inversion-mode difference is encoded to the variable-length code illustrated in Table 1.

TABLE 1

| inversion-mode difference | code |
|---|---|
| 0 | 0 |
| 1 | 10 |
| 2 | 110 |
| 3 | 111 |

In the case where the inversion mode is not appropriately predicted, the inversion-mode difference may be transmitted with a 2-bit fixed length and in regard to an encoding method of the inversion mode, the mode may be switched by judging prediction conformity by a predetermined unit such as a frame or a slice defined as MPEG4-AVC. InfoBits is calculated by acquiring a code amount required according to the defined code.

In step S507, the minimum values of ErrNorm(DVSearch), ErrLRinv(DVSearch), ErrULinv(DVSearch), and ErrULLRinv(DVSearch) which are generated are compared with the received MinErr. If the minimum value is smaller than MinErr (YES in step S508), the minimum value is set to MinErr, the inversion mode value having the minimum value is stored in ModeResult, and in this case, the disparity vector value DVSearch is stored in DVResult in step S509. If the minimum value is not smaller than MinErr (NO in step S508), the process just proceeds to step S510.

If the disparity vector value subjected to the error value calculation is a final vector in the detection range (YES in step S510), ModeResult, DVResult and difference values DiffMode, DiffDV between ModePred and DVPred between ModeResult and DVResult, respectively are outputted in step S511 and the process ends. If the disparity vector value is not the final vector (NO in step S510), the disparity vector value DVSearch is updated at a subsequent detection position in step S512 and the process proceeds back to step S504.

Subsequently, an operation of the disparity prediction signal generation unit 104 in FIG. 1 will be described. The disparity prediction signal generation unit 104 acquires as the reference image an encoded decoding image at a position which is shifted from the encoding target block by the disparity vector value, from the in-frame decoded image memory 111 by using the disparity vector value DVResult and the inversion mode ModeResult inputted from the disparity vector detection unit 103. The acquired reference image configures a prediction image block by replacing horizontal and vertical arrangement sequences depending on the inversion mode. In detail, a pixel position illustrated in the lower part of FIG. 3 is converted. The configured prediction image block is supplied to the subtractor 105 and the adder 110.

Subsequently, a detailed operation of the disparity vector/mode prediction unit 112 will be described.

The disparity vector/mode prediction unit 112 serves to calculate the prediction value ModePred of the inversion mode and the prediction value DVPred of the disparity vector and output the calculated prediction values to the disparity vector detection unit 103.

Figure 22:
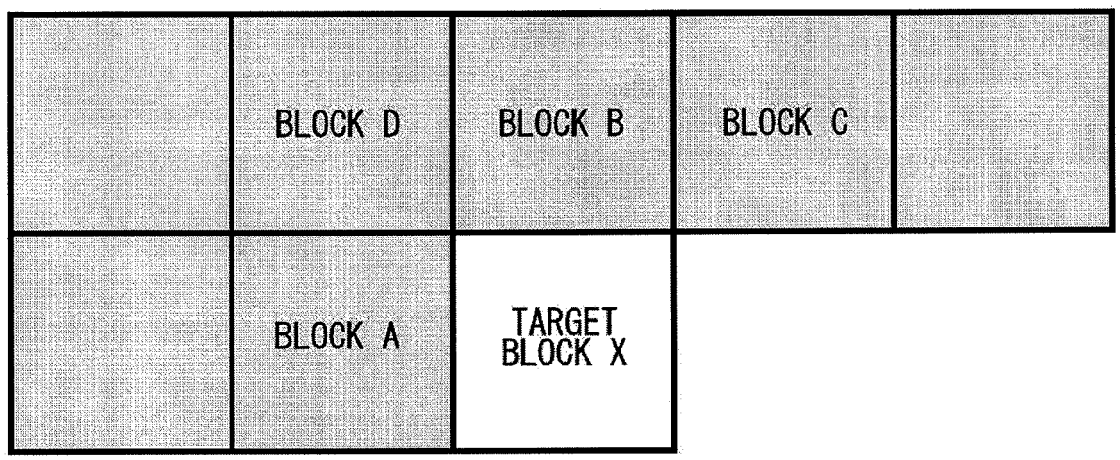
FIG. 22 is a diagram illustrating the relationship between a target block MPEG4-AVC and an adjacent block used to calculate a prediction motion vector.

In detail, by using the strong tendency that the inversion mode and the disparity vector represent the same value in the case where shapes of objects are continued among adjacent encoding target blocks, prediction is performed based on encoded information of neighboring blocks and the ModePred and the DVPred are generated. For example, a configuration used to predict a motion vector in MPEG4-AVC, as illustrated in FIG. 22 is used for the DVPred. As the adjacent blocks, three blocks of a block A adjacent to the left side, a block B adjacent to the upper side, and a block C adjacent to the upper-right side with respect to the target block are selected. However, in the case where the block C such as an image terminal is invalid, an upper-left block D is used. Assumed that horizontal components of disparity vectors of the three selected blocks are represented by DVAx, DVBx, and DVCx and vertical components are represented by DVAy, DVBy, and DVCy, the prediction disparity vector values PDVx and PDVy are generated by selecting median values of three values of the horizontal components and the vertical components, respectively as illustrated in the following Equation 1.

$$DMVx = \text{Median}(DVAx, DVBx, DVCx)$$

$$DMVy = \text{Median}(DVAy, DVBy, DVCy) \quad \text{(Equation 1)}$$

Similarly, the ModePred is also set by considering a correlation of inversion modes of adjacent blocks. In the case where two or more values are the same as each other in the inversion modes in three adjacent blocks, the value is set as the ModePred. In the case where all the values are different from each other, an inversion mode having a central value of three inversion modes is set as the ModePred.

The ModePred may be set based on proximity to the detected disparity vector. In this case, in the case where the disparity vector DVSearch is the optimal disparity vector in three adjacent blocks, an inversion mode of an adjacent block having a disparity vector with a smallest error from the DVSearch is set as the ModePred.

In regard to a prediction algorithm of the ModePred, Equation 1 may be selected and fixed, but the prediction value may be switched to a predetermined unit such as the frame or slice and a prediction algorithm adaptive to higher prediction may be set.

Subsequently, a detailed operation regarding decoding processing of disparity prediction in the decoding device will be described.

The disparity vector/mode decoding unit 203 in FIG. 2, which has the function of the disparity vector/mode prediction unit 112 in FIG. 1 (the encoding device), decodes the inversion mode value ModeResult and the disparity vector value DVResult by adding the generated ModePred and DVSearch and the difference values DiffMode and DffDV of the inversion mode and the disparity vector, which are inputted from the entropy decoding unit 202. The decoded ModeResult and DVResult are outputted from the disparity vector/mode decoding unit 203 to the disparity prediction signal generation unit 204.

The disparity prediction signal generation unit 204 has the same function as the disparity prediction signal generation unit 104 in FIG. 1 (encoding device) and acquires as the reference image an encoded decoding image at a position which is shifted from the encoding target block by the disparity vector value, from the in-frame decoded image memory 208 based on the ModeResult and DVResult inputted from the disparity vector/mode decoding unit 203. The disparity prediction signal generation unit 204 replaces an arrangement sequence of the pixels depending on the inversion mode with respect to the acquired reference image like the prediction signal generation unit 104 and configures the prediction image block to be outputted to the adder 207.

Figure 6:
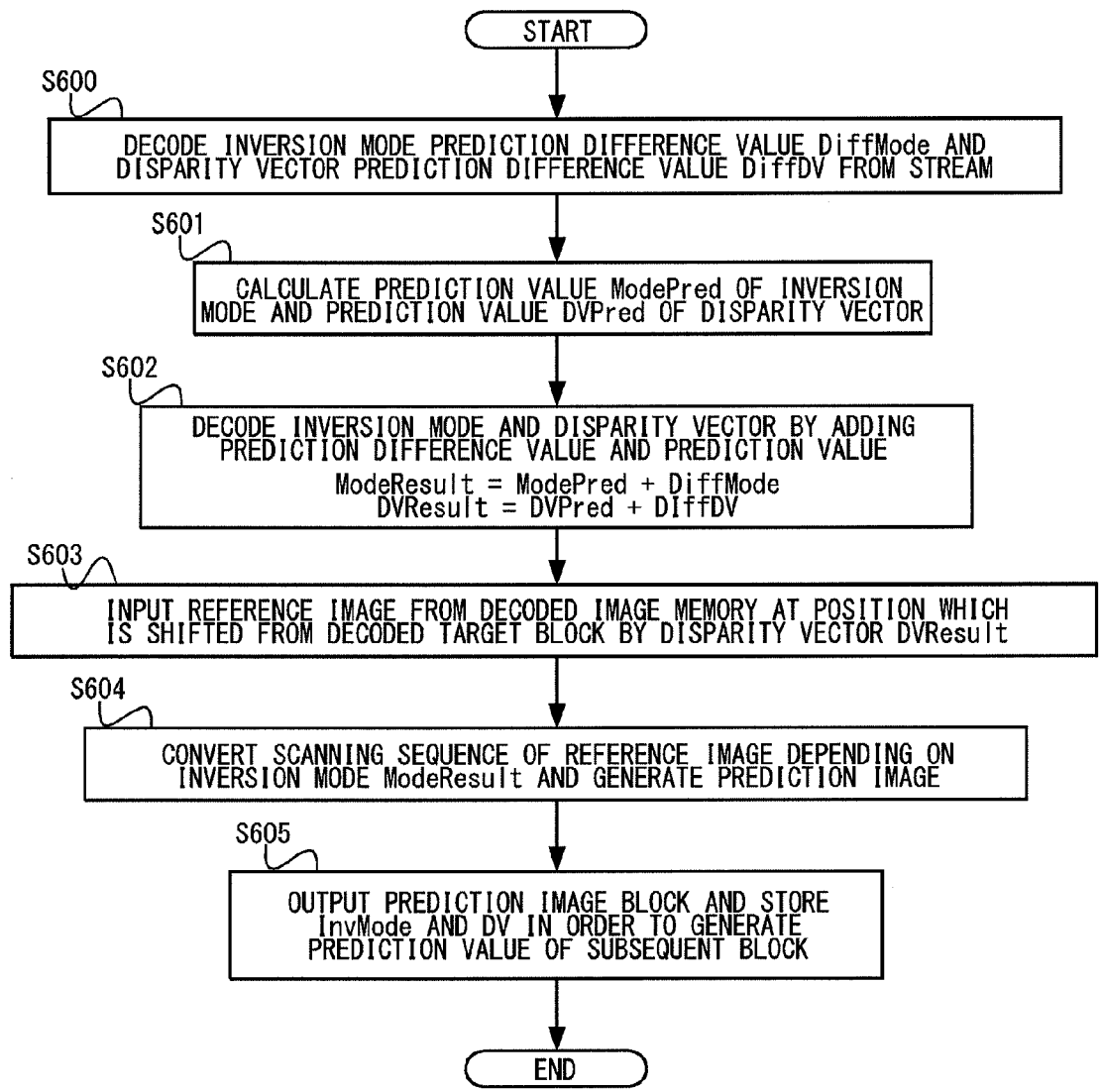
FIG. 6 is a flowchart illustrating a disparity vector decoding/prediction image generation operation according to the first embodiment of the present invention.

Herein, a flowchart representing the operations of the disparity vector/mode decoding unit 203 and the disparity prediction signal generation unit 204 in a processing sequence is illustrated in FIG. 6 and the detailed processing sequence will be described.

First, in step S600, the inversion mode prediction difference value DiffMode and the disparity vector prediction difference value DiffDV are decoded from a stream. In step S601, the inversion mode prediction value ModePred and the disparity vector prediction value DVPred are calculated. In step S602, the inversion mode ModeResult and the disparity vector DVResult are decoded by adding the prediction difference values and the prediction values by using the calculated result.

In the case where an inversion mode of an adjacent block having a disparity vector with a small error from the disparity vector value in the three adjacent blocks is set as the ModePred, the DVPred is calculated and added with the DiffDV, and the DVResult is decoded and thereafter, the ModePred is set from the disparity vector value of the adjacent block and the ModeResult is calculated.

In step S603, the reference image is inputted from a decoded image memory which is shifted from the encoding target block by the disparity vector DVResult. In step S604, in regard to the reference image, a scanning sequence of the reference image is converted depending on the inversion mode ModeResult and the prediction image block is configured.

Finally, in step S605, the prediction image block is outputted, and the ModeResult and the DVResult are stored in order to calculate a prediction value for a subsequent block and the process ends.

In the image encoding device and the image decoding device according to the first embodiment, a reference image vertically or horizontally inversed with respect to the encoded decoding image, which is used as the template signal for predicting the texture component, is generated and used as the prediction image, such that the prediction precision of the image signal in the frame in the related art can be improved. A prediction inversion mode is generated by using the correlation of the inversion mode with the adjacent block and the correlation of the disparity vector in regard to the inversion mode, such that additional information is implemented in a small amount, thereby improving encoding efficiency.

Since the disparity vector values in the respective inversion modes are encoded as information indicating relative positions to the encoding target block before inversion, the error may be evaluated in each inversion mode through a parallel operation after acquiring the reference image at one time in the encoding device, and since the prediction image of each inversion mode may be generated only by converting an address after acquiring the reference image even in the decoding device, a prediction image having a correlation may be acquired while suppressing an increase in processing.

Second Embodiment

Subsequently, forms of an image encoding device and an image decoding device according to a second embodiment of the present invention will be described. The first embodiment is the embodiment of the image encoding/decoding device using only the correlation in the frame, but the second embodiment is an embodiment of the image encoding/decoding device capable of using a temporal correlation of a moving image, which uses a correlation in the frame and a correlation between the frames.

Figure 7:
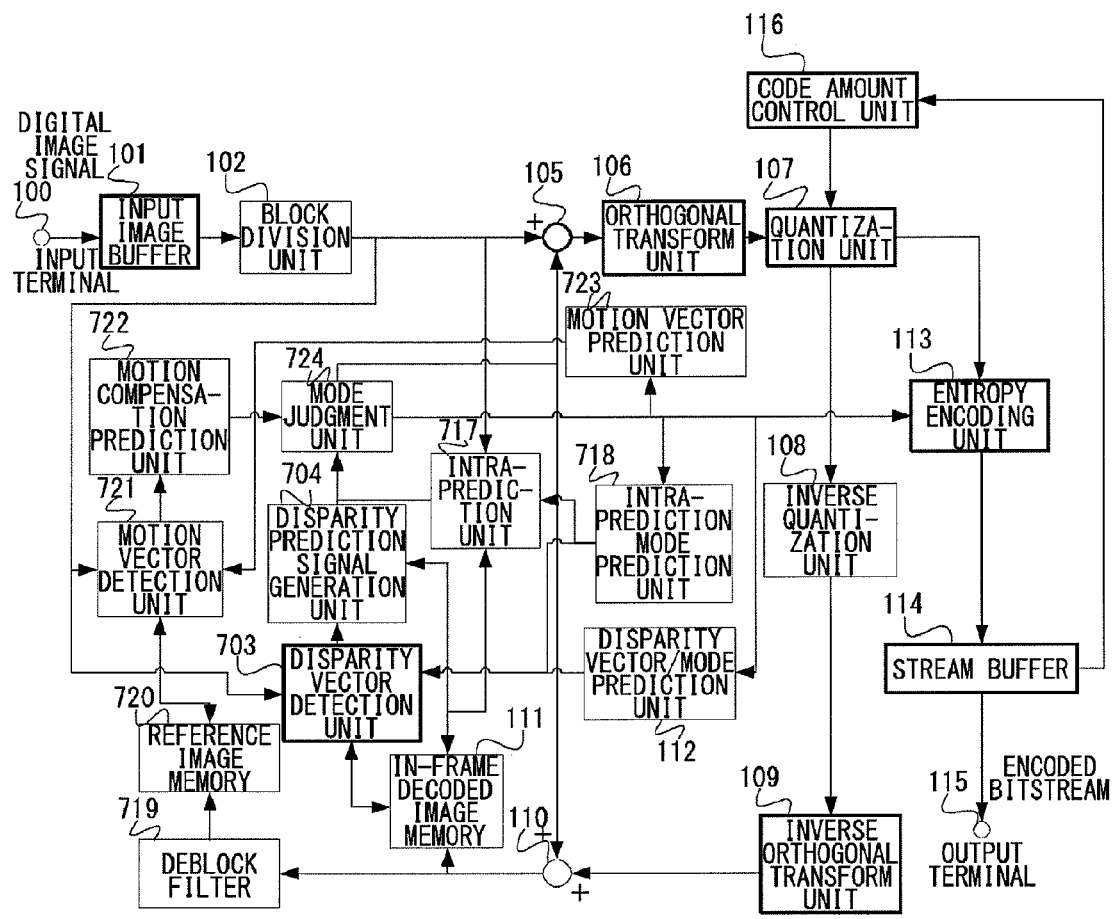
FIG. 7 is a configuration diagram illustrating an image encoding device according to a second embodiment of the present invention.

FIG. 7 is a configuration diagram illustrating the form of the image encoding device according to the second embodiment of the present invention. As illustrated in FIG. 7, the image encoding device according to the embodiment includes the input terminal 100, the input image buffer 101, the block division unit 102, the subtractor 105, the orthogonal transform unit 106, the quantization unit 107, the inverse quantization unit 108, the inverse orthogonal transform unit 109, the adder 110, the in-frame decoded image memory 111, the disparity vector/mode prediction unit 112, the entropy encoding unit 113, the stream buffer 114, the output terminal 115, and the code amount control unit 116 that have the same functions as those of the first embodiment, and further includes a disparity vector detection unit 703, a disparity prediction signal generation unit 704, the disparity vector/mode prediction unit 112 which perform additional processing with respect to the first embodiment, and an intra-prediction unit 717, an intra-prediction mode prediction unit 718, a deblock filter 719, a reference image memory 720, a motion vector detection unit 721, a motion compensation prediction unit 722, a motion vector prediction unit 723, and a mode judgment unit 724 which are added processing blocks.

When operations of the additional processing blocks are described, in the intra-prediction unit 717, the encoding target block is inputted from the block division unit 102, and intra-prediction processing configured by MPEG4-AVC is performed by using a decoded image of an adjacent encoded area, in the in-frame decoded image memory 111. The intra-prediction unit 717 selects an intra-prediction mode having a small code amount required by adding a prediction mode value, which is supplied from the intra-prediction mode prediction unit 718, and outputs an intra-prediction image and an intra-prediction mode signal, and an error evaluation value to the mode judgment unit 724. The intra-prediction mode prediction unit 718 acquires selection information of prediction processing and intra prediction mode information acquired from the mode judgment unit 724 and calculates a prediction value of an intra-prediction mode described in Literature 'ISO/IEC 14496-10 Advanced Video Coding.' A local decoded image outputted from the adder 110 is subjected to filter processing for removing distortion a block boundary of an encoding processing unit in the deblock filter 719 and received in the reference image memory 720. The motion vector detection unit 721 estimates a motion between the encoding target block image acquired from the block division unit 102 and the reference image received in the reference image memory 720. General motion estimation processing adopts block matching processing of segmenting a reference image at a position shifted from the same position in the screen by a predetermined amount of movement, acquiring an amount of movement, in which a prediction error is smallest when the image is set as the prediction block, as a motion vector value, while changing the amount of movement. The motion vector prediction unit 723 calculates a motion vector prediction value by the method described in Literature 'ISO/IEC 14496-10 Advanced Video Coding' and supplies the calculated motion vector prediction value to the motion vector detection unit 721. The motion vector detection unit 721 adds a code amount required to encode a difference between the motion vector prediction value and the motion vector value and detects an appropriate motion vector value.

The motion vector value acquired by the motion vector detection unit 721 is supplied to the motion compensation prediction unit 722. The motion compensation prediction unit 722 selects a prediction signal having smallest encoded difference information from prediction signals for a plurality of reference images and outputs the selected motion compensation prediction mode and prediction signal to the mode judgment unit 724. The processing block is a configuration for applying the intra-prediction and the motion compensation prediction in the related art.

Subsequently, operations of the disparity vector detection unit 703, the disparity prediction signal generation unit 704, and the mode judgment unit 724 will be described, as processing blocks that perform operations showing a feature of the second embodiment of the present invention.

The disparity vector detection unit 703 receives the prediction values of the disparity vector and the inversion mode for the target block, which are supplied from the disparity vector/mode prediction unit 112, receives the prediction value of the intra-prediction mode for the target block, which is supplied from the intra-prediction mode prediction unit, and performs disparity vector detection processing.

The disparity vector detection unit 703 outputs the detected disparity vector value and inversion mode value, and the error evaluation value, and information (hereinafter, referred to as a DC compensation bit) indicating that DC compensation is performed, to the disparity prediction signal generation unit 704. The disparity prediction signal generation unit 704 generates the prediction image from the in-frame decoded image memory 111 based on the disparity vector value and the inversion mode value inputted from the disparity vector detection unit 703, and the DC compensation bit and outputs the generated prediction image to the mode judgment unit 724 together with the disparity vector value, the inversion mode value, the error evaluation value, and the DC compensation bit. Detailed operations of the disparity vector detection unit 703 and the disparity prediction signal generation unit 704 will be described below.

The mode judgment unit 724 selects an appropriate prediction mode from the intra-prediction image, the intra-prediction mode, and the error evaluation value inputted from the intra-prediction unit 717, the motion compensation prediction image, the motion compensation prediction mode, the motion vector value, and the error evaluation value inputted from the motion compensation prediction unit 722, and the disparity prediction image, the disparity vector value, the inversion mode value, the DC compensation bit, and the error evaluation value inputted from the disparity prediction signal generation unit 704. The appropriate prediction mode is selected from the intra-prediction and the disparity prediction with respect to an encoded frame only in the frame without the reference image of the motion compensation prediction.

The mode judgment unit 724 outputs a prediction image block for the selected prediction mode to the subtractor 105 and the adder 110, and supplies prediction mode information as additional information and information required to be encoded depending on the prediction mode to the entropy encoding unit 113.

The information required to be encoded depending on the prediction mode is supplied even to the motion vector prediction unit 723, the intra-prediction mode prediction unit 718, and the disparity vector/mode prediction unit 112, and prediction signals of various additional information in a subsequent encoding target block are generated.

Subsequently, the form of the image decoding device that decodes the encoded bitstream generated by the image encoding device according to the second embodiment of the present invention will be described.

Figure 8:
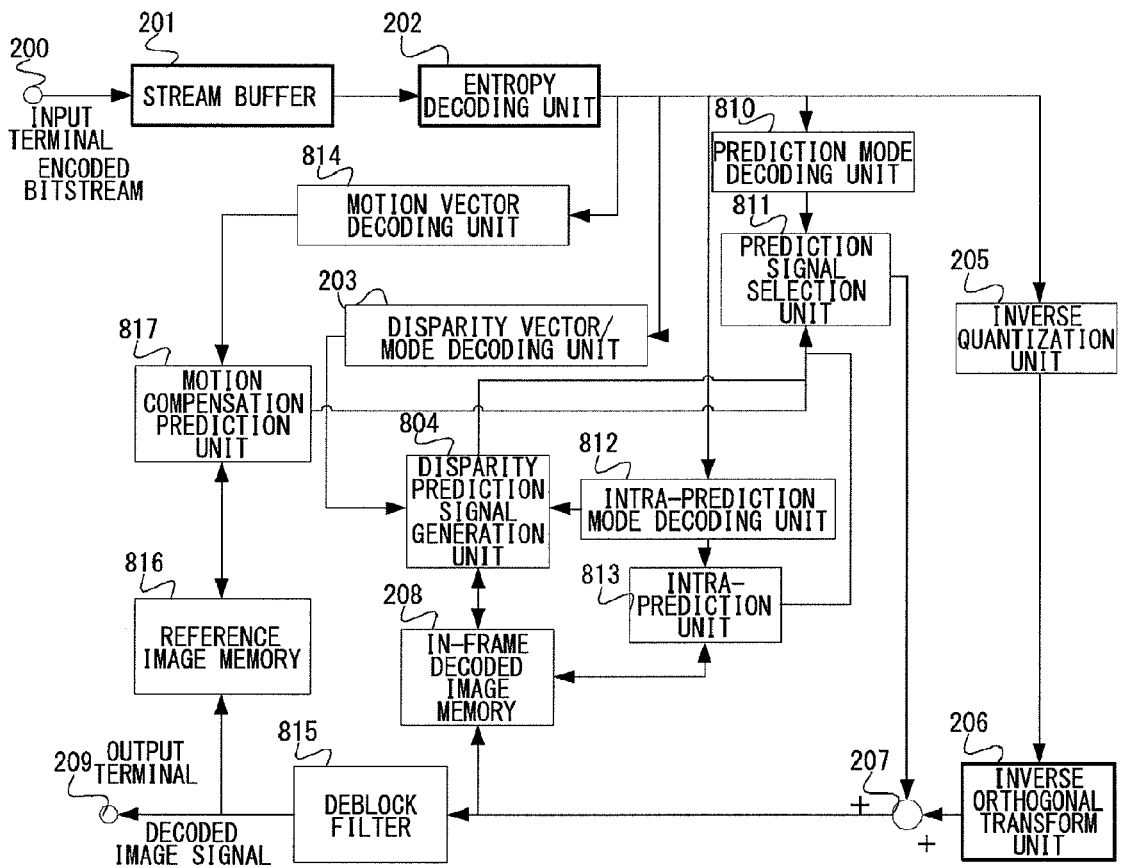
FIG. 8 is a configuration diagram illustrating an image decoding device according to the second embodiment of the present invention.

FIG. 8 is a configuration diagram illustrating the form of the image decoding device according to the second embodiment of the present invention. As illustrated in FIG. 8, the image decoding device of the embodiment includes the input terminal 200, the stream buffer 201, the entropy decoding unit 202, the disparity vector/mode decoding unit 203, the inverse quantization unit 205, the inverse orthogonal transform unit 206, the adder 207, an in-frame decoded image memory 208, and the output terminal 209 that have the same functions as in the first embodiment, a disparity prediction signal generation unit 804 which performs additional processing with respect to the first embodiment, and a prediction mode decoding unit 810, a prediction signal selection unit 811, an intra-prediction mode decoding unit 812, an intra-prediction unit 813, a motion vector decoding unit 814, a deblock filter 815, a reference image memory 816, and a motion compensation prediction unit 817 which are additional processing blocks.

Since the intra-prediction mode decoding unit 812, the intra-prediction unit 813, the motion vector decoding unit 814, the deblock filter 815, the reference image memory 816, and the motion compensation prediction unit 817 in the additional processing blocks are configurations for decoding the intra-prediction and the motion compensation prediction in the MPEG4-AVC standard like the description of the image encoding device according to the second embodiment in FIG. 7, but are not processing blocks having the feature of the present invention, a description thereof will be omitted.

Subsequently, operations of the prediction mode decoding unit 810, the prediction signal selection unit 811, and the disparity prediction signal generation unit 804, as the processing blocks that perform operations representing the feature of the second embodiment of the present invention will be described.

Prediction mode information variable-length decoded from the entropy decoding unit 202 is received in the prediction mode decoding unit 810 and is acquired as information indicating a prediction signal generation method in the decoding target block. The prediction mode information is inputted into the prediction signal selection unit 811 from the prediction mode decoding unit 810 and in addition, the prediction image block is inputted into the prediction signal selection unit 811 from any one of the motion compensation prediction unit 817, the intra-prediction unit 813, and the disparity prediction signal generation unit 804 according to the prediction signal generation method.

The prediction signal selection unit 811 outputs the inputted prediction image block to the adder 207, the prediction image block is added to a decoded difference signal outputted to the adder 207 from the inverse orthogonal transform unit 206, and the decoded image signal is generated.

Since the configuration of the disparity prediction signal generation unit 804 in the decoding device of FIG. 8 is the same as the configuration of the disparity prediction signal generation unit 704 in the encoding device of FIG. 7, a detailed operation thereof will further be described.

First, the detailed operation of the disparity vector detection unit 703 will be described by using a configuration diagram of FIG. 9 and a detection flowchart of FIG. 10.

Figure 9:
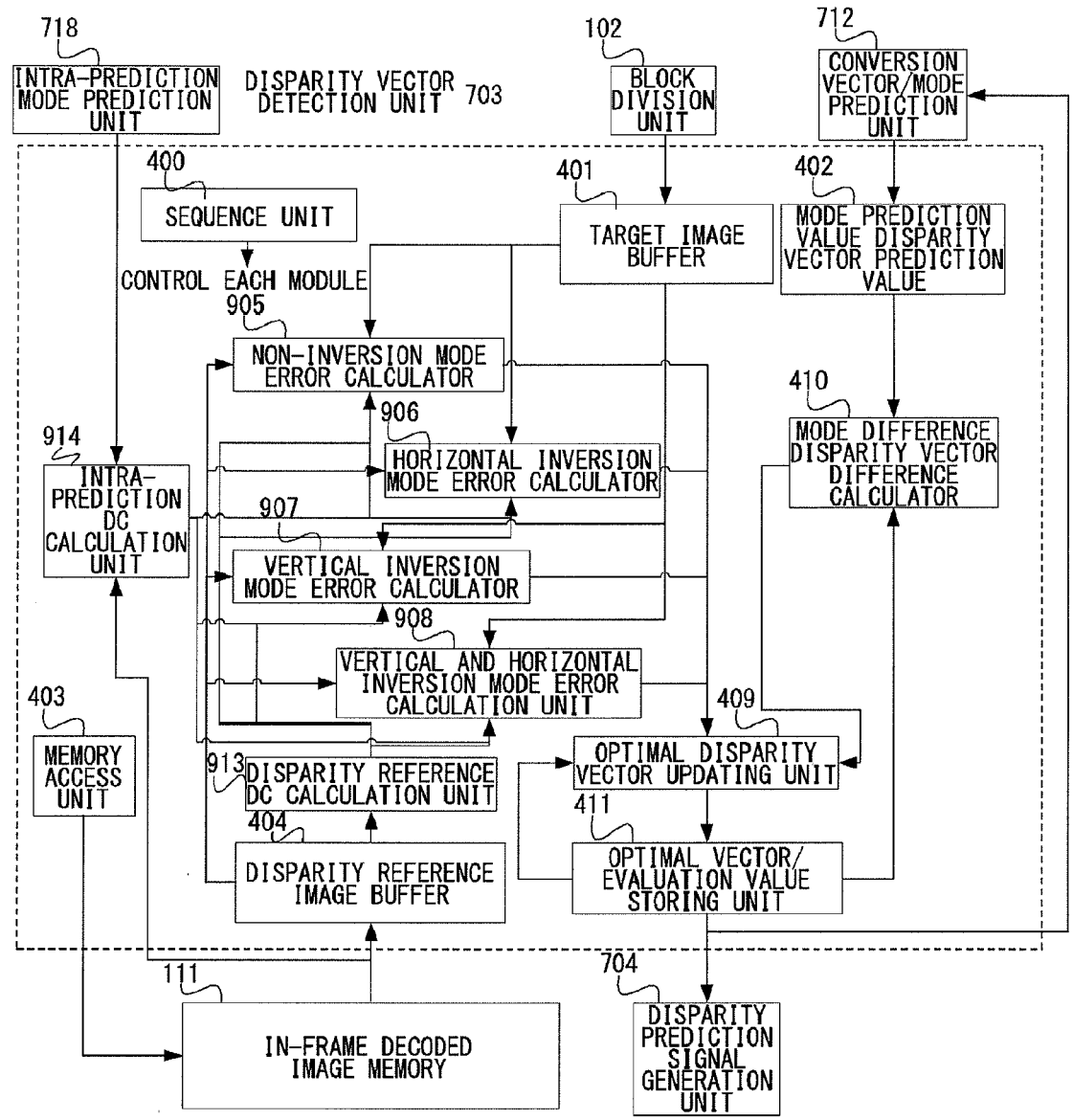
FIG. 9 is a configuration diagram illustrating a disparity vector detection unit according to the second embodiment of the present invention.
Figure 10:
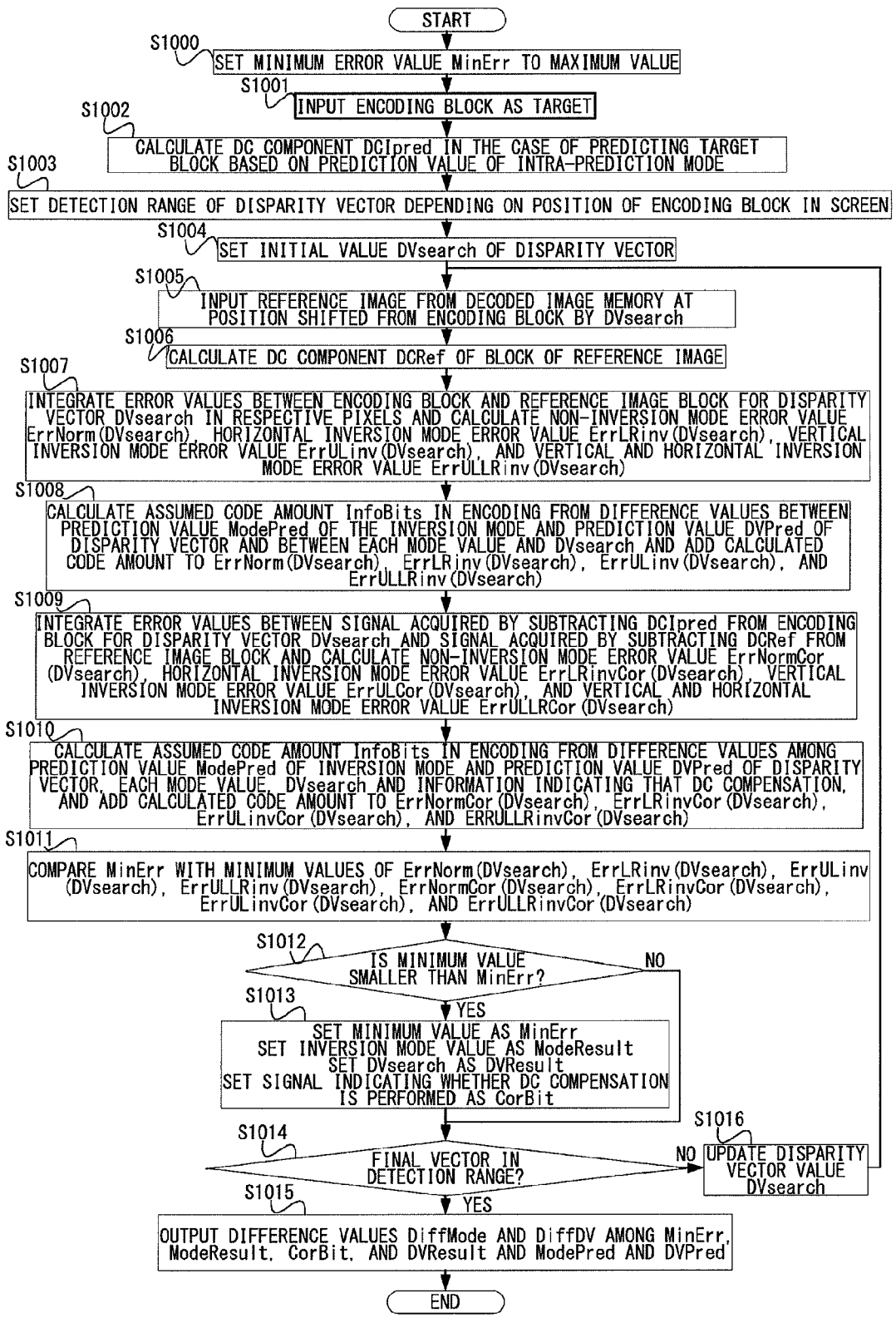
FIG. 10 is a flowchart illustrating a detection operation of a disparity vector according to the second embodiment of the present invention.

The disparity vector detection unit 703 illustrated in FIG. 9 includes the sequence unit 400, the target image buffer 401, the mode prediction value disparity vector prediction value buffer 402, the memory access unit 403, the disparity reference image buffer 404, the optimal disparity vector updating unit 409, mode difference disparity vector difference calculator 410, and optimal vector/evaluation value storing unit 411 which are the processing blocks having the same function as the disparity vector detection unit 103 in the first embodiment, and a non-inversion mode error calculator 905, a horizontal inversion mode error calculator 906, a vertical inversion mode error calculator 907, and a vertical and horizontal inversion mode error calculator 908 which have additional functions in the processing blocks, and a disparity reference DC calculation unit 913 and an intra-prediction DC calculation unit 914 which are additional processing blocks.

In the second embodiment, with respect to the disparity prediction processing in the first embodiment, a DC component equivalent to an average value of the block is compensated with respect to the disparity prediction processing and a mode to directly predict the texture component, which is a change amount in the encoding target block, is provided, to thereby improve advanced prediction efficiency, in addition to the point that the intra-prediction and the motion compensation prediction which are the prediction method in the related art are selected based on the prediction error evaluation value to implement higher-efficiency encoding processing.

In detail, in order to compensate a component equivalent to the DC component without using the additional information, a function of calculating the DC component of the prediction block configured by the prediction mode of the intra-prediction and compensating an error from the DC component of the reference block acquired from a position separated by the disparity vector is provided.

The prediction mode of the intra-prediction inputted from the intra-prediction mode prediction unit 718 is received in the intra-prediction DC calculation unit 914. The intra-prediction DC calculation unit 914 calculates the DC component of the intra-prediction block using the decoded image signal adjacent to the target block from the in-frame decoded image memory 111 according to the prediction mode.

The reference image block is supplied from the reference image buffer 404 to the disparity reference DC calculation unit 913, which calculates the DC component of the reference image block.

The calculated DC component is supplied from the intra-prediction DC calculation unit 914 and the disparity reference DC calculation unit 913 to the non-inversion mode error calculator 905, the horizontal inversion mode error calculator 906, the vertical inversion mode error calculator 907, and the vertical and horizontal inversion mode error calculator 908 and used to generate the error evaluation value of a DC compensation mode.

The non-inversion mode error calculator 905, the horizontal inversion mode error calculator 906, the vertical inversion mode error calculator 907, and the vertical and horizontal inversion mode error calculator 908 have an additional function of calculating the prediction error value using the DC compensation mode as compared with the non-inversion mode error calculator 405, the horizontal inversion mode error calculator 406, the vertical inversion mode error calculator 407, and the vertical and horizontal inversion mode error calculator 408 in the first embodiment, and an error evaluation in the case of not using the DC compensation mode and an error evaluation value in the case of using the DC compensation mode are supplied to the optimal disparity vector updating unit 409.

Subsequently, a sequence as calculation processing of the detection processing will be described illustrated through the flowchart in FIG. 10 as a processing sequence managed by the sequence unit 400.

In step S1000, a minimum error value MinErr is firstly set to a maximum value (for example, 0xffffffff in the case where a storage area is 32 bits) with respect to the target encoding block. In step S1001, the target encoding block is inputted. In step S1002, a DC component DCIpred in the case of predicting the target block is calculated based on the prediction value of the intra-prediction mode. In step S1003, a detection range of the disparity vector is set depending on the position of the encoding block in the screen. In step S1004, an initial value DVSearch of the disparity vector is set based on the set limited detection range. In step S1005, the reference image block is inputted from a decoded image memory which is shifted from the encoding block by DVSearch, with the set DVSearch.

In step S1006, a DC component DCRef of the inputted reference image block is calculated.

In step S1007, error values of the encoding block when DC compensation is not performed and the reference image block for the disparity vector DVSearch in respective pixels are integrated by using the reference image block and the encoding target block, and a non-inversion mode error value ErrNorm(DVSearch), a horizontal inversion mode error value ErrLRinv(DVSearch), a vertical inversion mode error value ErrULinv(DVSearch), and a vertical and horizontal inversion mode error value ErrULLRinv(DVSearch) are calculated.

Difference values DiffMode, DiffDV between a prediction value ModePred of the inversion mode and a prediction value DVPred of the disparity vector and each mode value and DVSearch are calculated, and an assumed code amount InfoBits in encoding is calculated. In step S1008, InfoBits calculated with the respective inversion modes is added to ErrNorm(DVSearch), ErrLRinv(DVSearch), ErrULinv(DVSearch), and ErrULLRinv(DVSearch).

In step S1009, error values between signals acquired by subtracting the DCIpred from the respective pixels of the encoding block for the disparity vector DVsearch and signals acquired by subtracting the DCRef from the respective pixels of the reference image block are integrated in order to calculate an error value in the case of performing DC compensation, and a non-inversion mode error value ErrNormCor(DVSearch), a horizontal inversion mode error value ErrLRinvCor(DVSearch), a vertical inversion mode error value ErrULCor(DVSearch), and a vertical and horizontal inversion mode error value ErrULLRCor(DVSearch) are calculated.

In step S1010, by adding a code amount required for information indicating that the DC compensation is performed to difference values among the prediction value ModePred of the inversion mode, the prediction value DVPred of the disparity vector, each mode value, the DVSearch, the assumed code amount InfoBits in encoding is calculated and added to ErrNormCor(DVsearch), ErrLRinvCor(DVsearch), ErrULinvCor(DVsearch), and ErrULLRinvCor(DVsearch).

In step S1011, minimum values of ErrNorm(DVSearch), ErrLRinv(DVSearch), ErrULinv(DVSearch), ErrULLRinv (DVSearch), ErrNormCor(DVsearch), ErrLRinvCor (DVsearch), ErrULinvCor(DVsearch), and ErrULLRinvCor (DVsearch) which are generated are compared with the received MinERR. If the minimum value is smaller than MinErr (YES in step S1012), the minimum value is set to MinErr, the inversion mode value having the minimum value is stored in ModeResult, and in the case, the disparity vector value DVSearch is stored in DVResult, and a signal indicating whether the DC compensation is performed is set and stored in CorBit, in step S1013. If the minimum value is not smaller than MinErr (NO in step S1012), the process just proceeds back to step S1014.

If the disparity vector value subjected to the error value calculation is a final vector in the detection range (YES in step S1014), the error evaluation values MinErr, ModeResult and DVResult, and DiffMode that is a difference value between ModeResult and ModePred, and DiffDV that is a difference value between DVResult and DVPred, and CorBit are outputted (step S1015) and the process ends. If the disparity vector value is not the final vector (NO in step S1014), the disparity vector value DVSearch is updated at a subsequent detection position in step S1016 and the process proceeds back to step S1005.

Processing of decoding the disparity prediction image block generated in the prediction algorithm will be described by using a flowchart of FIG. 11.

Figure 11:
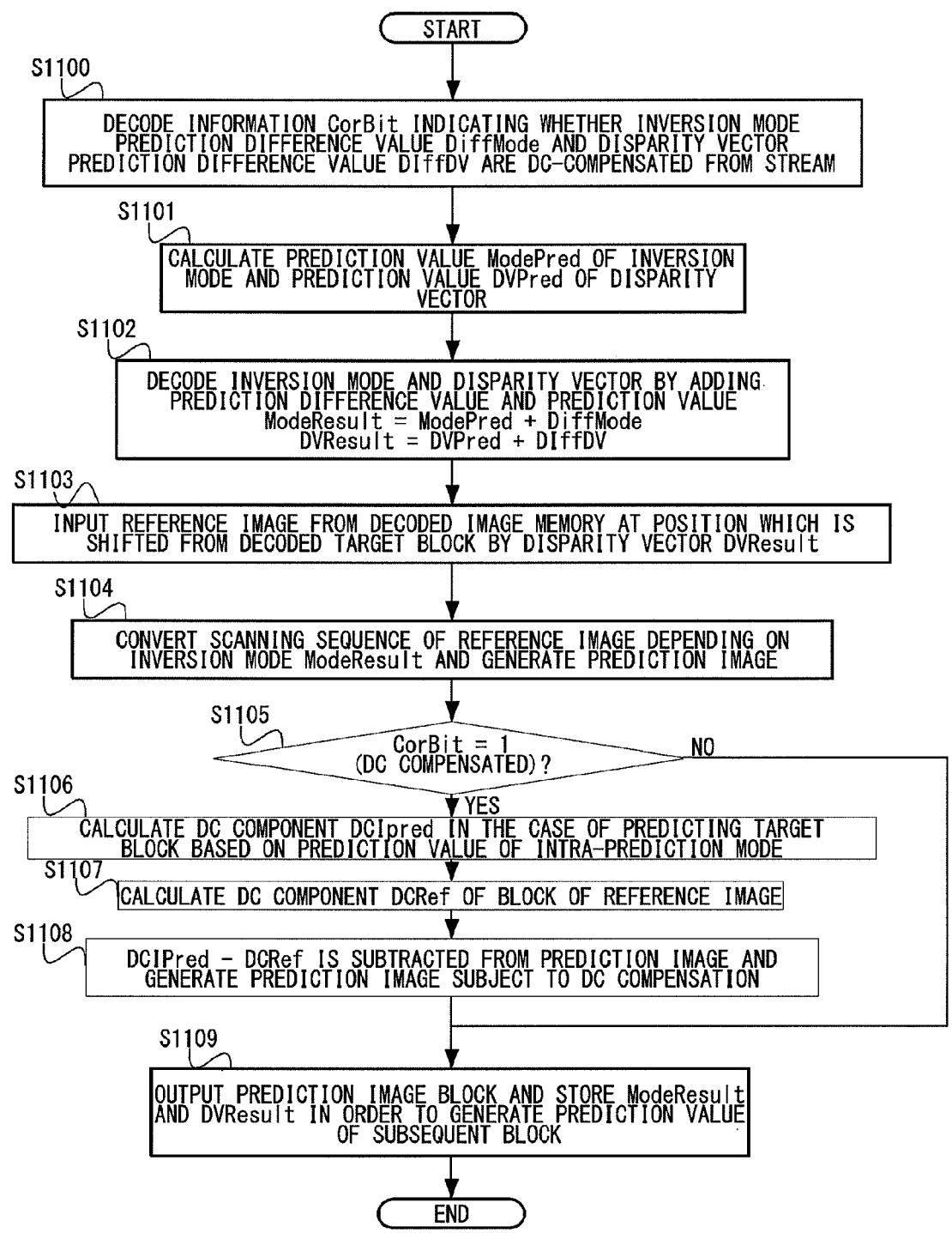
FIG. 11 is a flowchart illustrating a disparity vector decoding/prediction image generation operation according to the second embodiment of the present invention.

The flowchart of FIG. 11 represents the operations of the disparity vector/mode decoding unit 203 and the disparity prediction signal generation unit 804 in a processing sequence, and the disparity prediction signal generation unit 704 in FIG. 7 also has the disparity prediction signal generation processing function which operates herein.

First, in step S1100, the inversion mode prediction difference value DiffMode, the disparity vector prediction difference value DiffDV, and the information CorBit indicating whether the DC compensation is performed are decoded from the stream. In step S1101, the prediction value ModePred of the inversion mode and the prediction value DVPred of the disparity vector are calculated. In step S1102, the inversion mode ModeResult and the disparity vector DVResult are decoded by adding the prediction difference values and the prediction values by using the calculated result.

In step S1103, the reference image is inputted from the decoded image memory at the position which is shifted from the decoding target block by the disparity vector DVResult. In step S1104, in regard to the reference image, a scanning sequence of the reference image is converted depending on the inversion mode ModeResult and the prediction image block is configured.

If the information CorBit indicating whether the DC compensation is performed is 1 (YES in step S1105), the prediction value of the intra-prediction mode is acquired via the in-frame decoded image memory 208 in FIG. 8 and the DCIpred which is the DC component in the case of intra-prediction of the decoding target block is calculated in step S1106. In step S1107, DCRef which is the DC component of the reference image block is calculated. In step S1108, DCIpred-DCRef is subtracted from the prediction image and the prediction image subject the DC compensation is generated.

Meanwhile, if CorBit is not 1 (No in step S1105), the process proceeds to step S1109 without performing the DC compensation.

Finally, in step S1109, the prediction image block is outputted, and the ModeResult and the DVResult are stored in order to calculate a prediction value for a subsequent block and the process ends.

In the second embodiment, in addition to an effect for the disparity prediction processing using the vertical and horizontal inversion shift for the reference image in the first embodiment, the DC component equivalent to the average value of the block is compensated with respect to the disparity prediction processing, the mode to directly predict the texture component which is the change amount in the encoding target block is provided to improve the advanced prediction efficiency, and disparity prediction precision may be improved when a component having the same texture in the screen deviates from a luminance value due to a light matching degree or shade.

In the second embodiment, the DC component of the encoding target block is estimated and compensated based on the prediction mode information of the intra-prediction mode, but the DC component may be estimated from an adjacent decoded image by a fixed algorithm and in this case, and the DC component estimation and compensation may be added in the configuration of the first embodiment.

Compensating a more accurate DC component by additionally transmitting the DC component of the encoding target block is in a desired range of the configuration and becomes an effective function for the encoding target block, while achieving improvement of prediction efficiency to reduce a transmitted code amount even though the DC component is transmitted.

Third Embodiment

Subsequently, forms of an image encoding device and an image decoding device according to a third embodiment of the present invention will be described. The third embodiment is an embodiment in which a function of calculating the disparity vector by using the adjacent image of the encoding target block, which is presented in Japanese Patent Application Laid-Open No. 2007-043651 as the template is added in the configuration of the second embodiment, and a block in which the reference image is vertically and horizontally inverted is provided as a prediction target signal with respect to a vector calculation function, which is a feature of the present invention.

Figure 12:
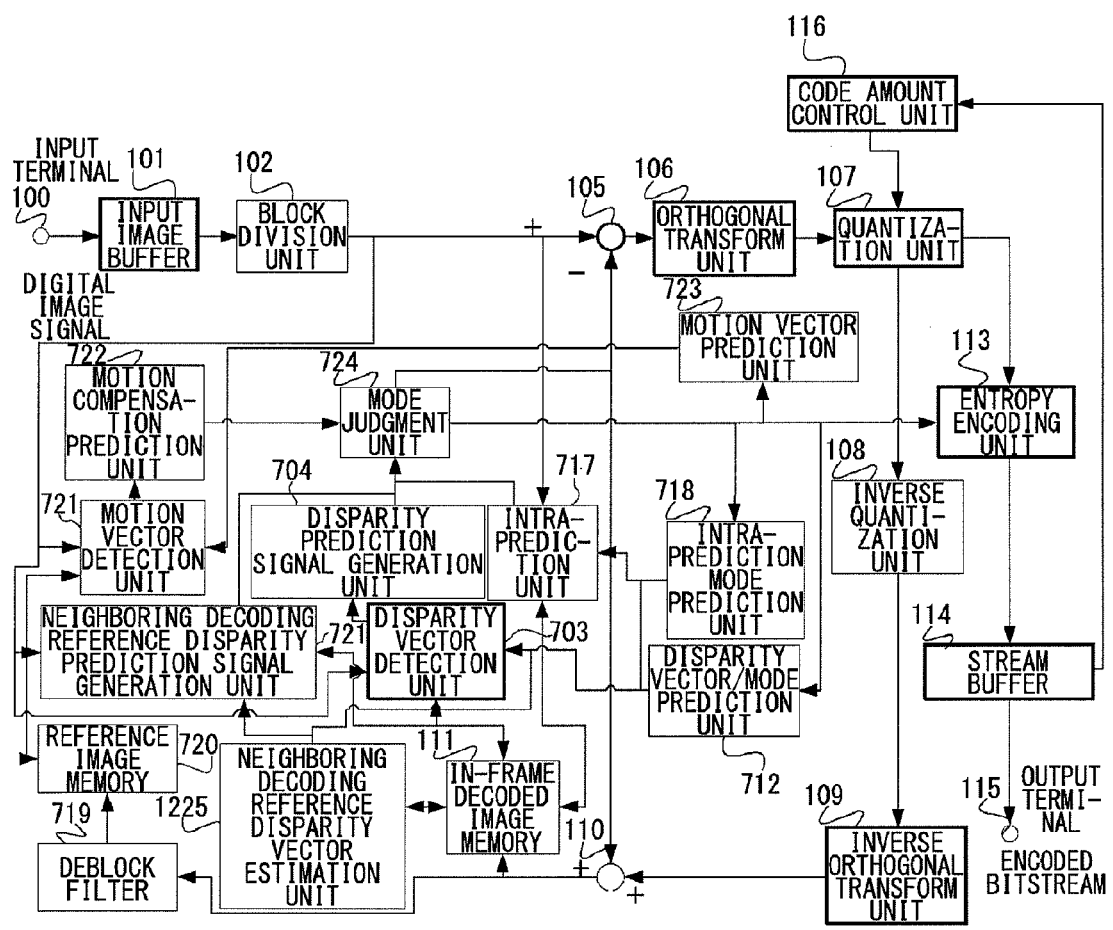
FIG. 12 is a configuration diagram illustrating an image encoding device according to a third embodiment of the present invention.
Figure 13:
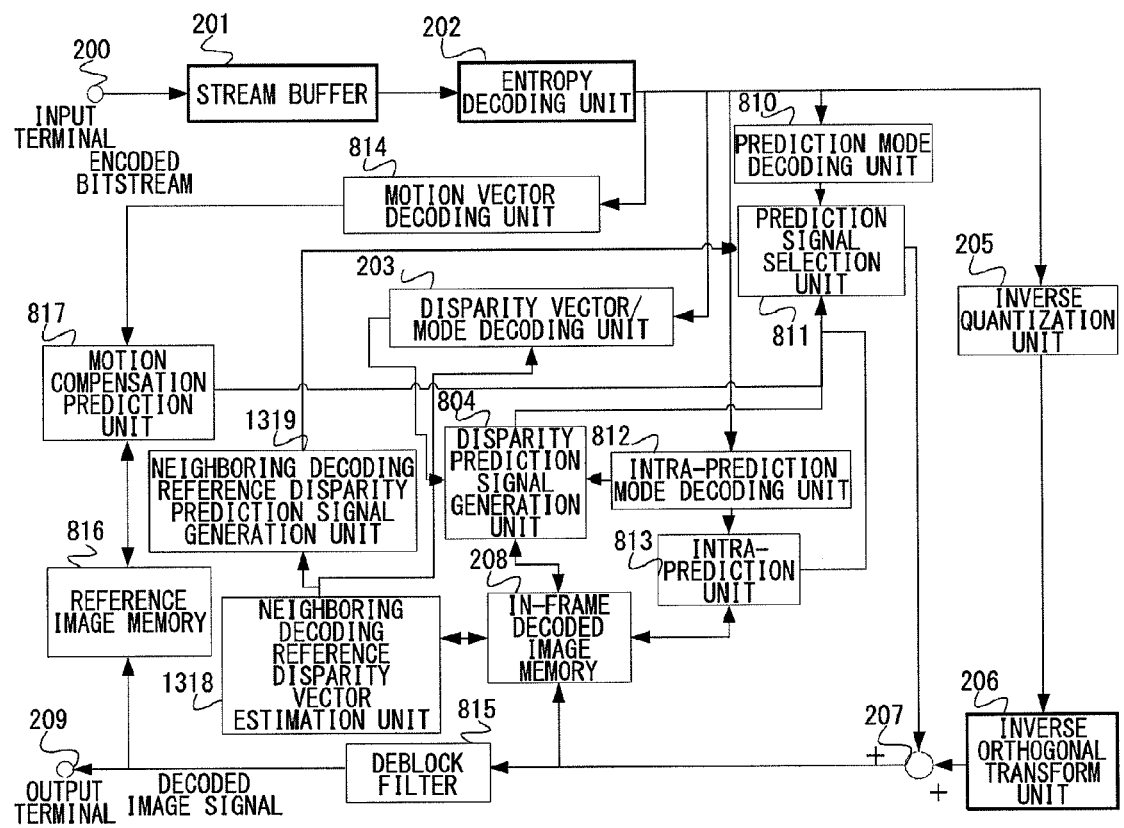
FIG. 13 is a configuration diagram illustrating an image decoding device according to the third embodiment of the present invention.

FIG. 12 is a configuration diagram of the image encoding device according to the third embodiment and FIG. 13 is a configuration diagram of the image decoding device according to the third embodiment, and operations thereof. will be described.

As illustrated in FIG. 12, the image encoding device according to the embodiment further includes a neighboring decoding reference disparity vector estimation unit 1225 and a neighboring decoding reference disparity prediction signal generation unit 1226 in addition to the processing blocks having the same functions as those of the second embodiment, and as illustrated in FIG. 13, the image decoding device according to the embodiment further includes a neighboring decoding reference disparity vector estimation unit 1318 and a neighboring decoding reference disparity prediction signal generation unit 1319 in addition to the processing blocks having the same functions as those of the second embodiment.

Since these additional processing blocks serve to calculate the disparity vector by using the adjacent image of the encoding target block as the template, the processing blocks in the encoding device and the processing blocks in the decoding blocks have the same functions as each other. Therefore, detailed operations thereof are described.

First, a method for estimating a neighboring decoding reference disparity vector according to the present invention will be described by using FIG. 14. The point of the present invention in the third embodiment is that the blocks in which the reference image is inverted vertically and horizontally is added as the prediction target signal, the inversion mode and the disparity vector are estimated from the neighboring decoded image of the encoding target block by using a template matching method to generate a prediction block having a higher correlation with the encoding block without adding the additional information, in order to more sufficiently use the self-similarity of the image signal or the similarity of the texture than the related art.

Figure 14:
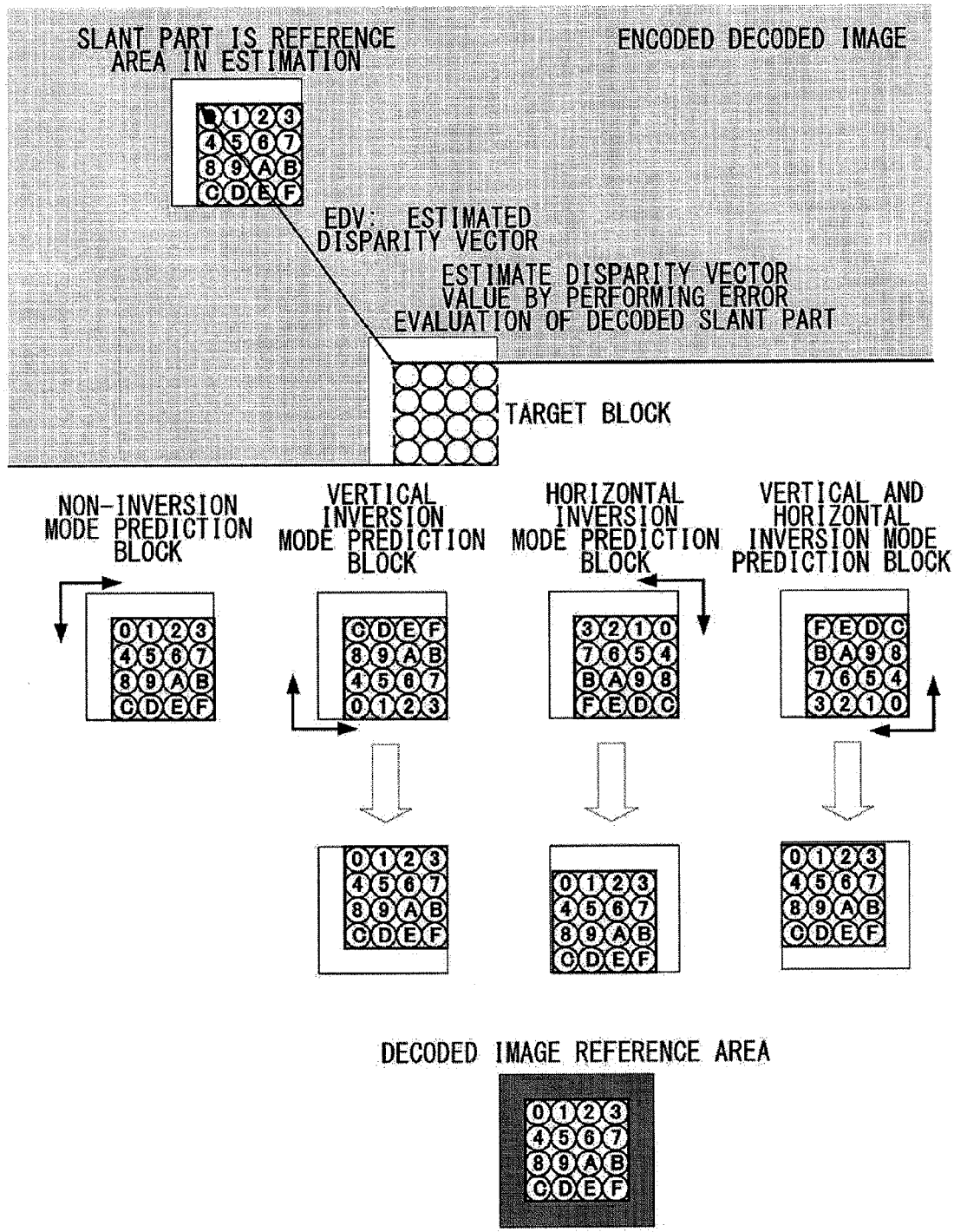
FIG. 14 is a conceptual diagram illustrating estimation of a neighboring decoding reference disparity vector of the present invention.

In an upper part of FIG. 14, a non-inversion template is the reference image (encoded decoding image) used for prediction using estimation of the neighboring decoding reference disparity vector in the related art.

An error with image information (hereinafter, referred to as a reference template) of an area marked by a slant line at an upper-left part of the reference block used as the prediction signal, which is present at a position where the encoded decoding image is shifted by the disparity vector, from image information in an area marked by a slant line at an upper-left part of the encoding target block, is evaluated, and a disparity vector value having a smallest error value is calculated as an estimated displacement vector (EDV) and the disparity vector value represented by EDV, that is, the reference image at a position shifted with respect to the encoding target block is used as the prediction image.

In order to allow the prediction processing using the inverted template as the point of the present invention to function in estimating the neighboring decoding reference disparity vector, the position of the reference template for the same disparity vector is changed depending on the inversion mode.

In detail, as illustrated at the center of FIG. 14, when the reference block is inverted vertically, horizontally, and vertically and horizontally, in the case of the image signal positioned at the upper-left part of the encoding target block, a lower-left decoded image may be used in the vertical inversion mode, an upper-right decoded image may be used in the case of the horizontal inversion mode, and a lower-right decoded image may be used in the case of a prediction block of a vertical/horizontal inversion mode, with respect to the reference block.

In FIGS. 12 and 13, the neighboring decoding reference disparity vector estimation units 1225 and 1318 may perform disparity-vector estimation and inversion-mode estimation with reference to neighboring decoding for four inversion modes by acquiring all neighboring images of the reference image block which can be acquired based on the disparity vector as illustrated in the lower part of FIG. 14, at the time of evaluating an error for a predetermined disparity vector value.

Figure 15:
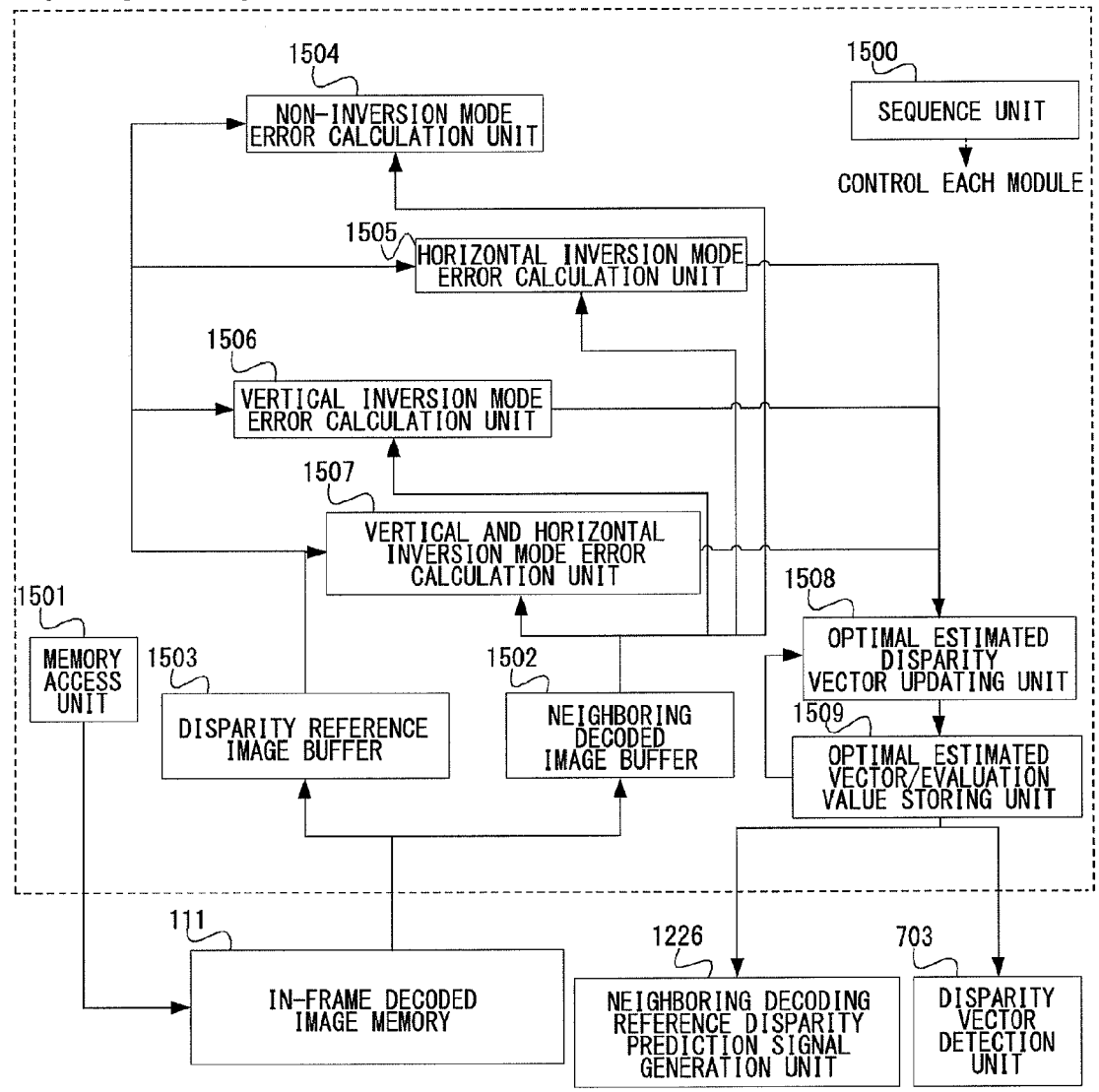
FIG. 15 is a configuration diagram illustrating a neighboring decoding reference vector estimation unit according to the third embodiment of the present invention.

A configuration diagram of the neighboring decoding reference disparity vector estimation unit 1225 is illustrated in FIG. 15 and an operation thereof will be described.

The neighboring decoding reference disparity vector estimation unit 1225 includes a sequence unit 1500, a memory access unit 1501, a neighboring decoded image buffer 1502, a disparity reference image buffer 1503, a non-inversion mode error calculation unit 1504, a horizontal inversion mode error calculator 1505, a vertical inversion mode error calculator 1506, a vertical and horizontal inversion mode error calculator 1507, an optimal estimation disparity vector updating unit 1508, and an optimal estimation vector/evaluation value storing unit 1509, as illustrated in FIG. 15.

The memory access unit 1501 acquires neighboring image information adjacent to the position of the encoding target block from the in-frame decoded image memory 111 and supplies the acquired neighboring image information to the neighboring decoded image buffer 1502. The memory access unit 1501 acquires the reference block together with the disparity vector value, which is managed by the sequence unit 1500 from the in-frame decoded image memory 111 and stores the acquired reference block in the disparity reference image buffer 1503.

The same neighboring decoded image signal is supplied from the neighboring decoded image buffer 1502 to the non-inversion mode error calculator 1504, the horizontal inversion mode error calculator 1505, the vertical inversion mode error calculator 1506, and the vertical and horizontal inversion mode error calculator 1507.

Meanwhile, an upper-left image signal of the reference image block, an upper-right image signal of the reference image block, a lower-left reference image signal of the reference image block, and a lower-right reference image signal of the reference image block are supplied as neighboring reference images to the non-inversion mode error calculator 1504, the horizontal inversion mode error calculator 1505, the vertical inversion mode error calculator 1506, and the vertical and horizontal inversion mode error calculator 1507, from the disparity reference image buffer 1503, respectively, as illustrated in FIG. 14.

The non-inversion mode error calculator 1504, the horizontal inversion mode error calculator 1505, the vertical inversion mode error calculator 1506, and the vertical and horizontal inversion mode error calculator 1507 serve to calculate square differences of the inputted neighboring decoded images and neighboring reference images in the respective pixels and store a total sum thereof.

Therefore, prediction error evaluation values of the non-inversion mode prediction block, the vertical inversion mode prediction block, the horizontal inversion mode prediction block, and the vertical and horizontal inversion mode prediction block illustrated in FIG. 14 are generated.

The non-inversion mode error calculator 1504, the horizontal inversion mode error calculator 1505, the vertical inversion mode error calculator 1506, and the vertical and horizontal inversion mode error calculator 1507 output a block sum of respective calculated square error values to the optimal estimated disparity vector updating unit 1508.

The optimal disparity vector updating unit 1508 compares a minimum error evaluation value for the same encoding target block with an error evaluation value (a sum of square errors) of the respective inversion modes in the disparity vector value managed by the sequence unit 1500, updates an inversion mode and a disparity vector having a smallest evaluation value as an optimal estimated inversion mode and an optimal estimated disparity vector, and outputs the inversion mode and the disparity vector together with the evaluation value in the optimal estimated vector/evaluation value storing unit 1509.

After an error for a disparity vector value in a retrieval range managed by the sequence unit 1500 is evaluated, the optimal estimated vector/evaluation value storing unit 1509 outputs the received estimated inversion mode and estimated disparity vector to the neighboring decoding reference disparity prediction signal generation unit 1226 and the disparity vector detection unit 703.

Figure 16:
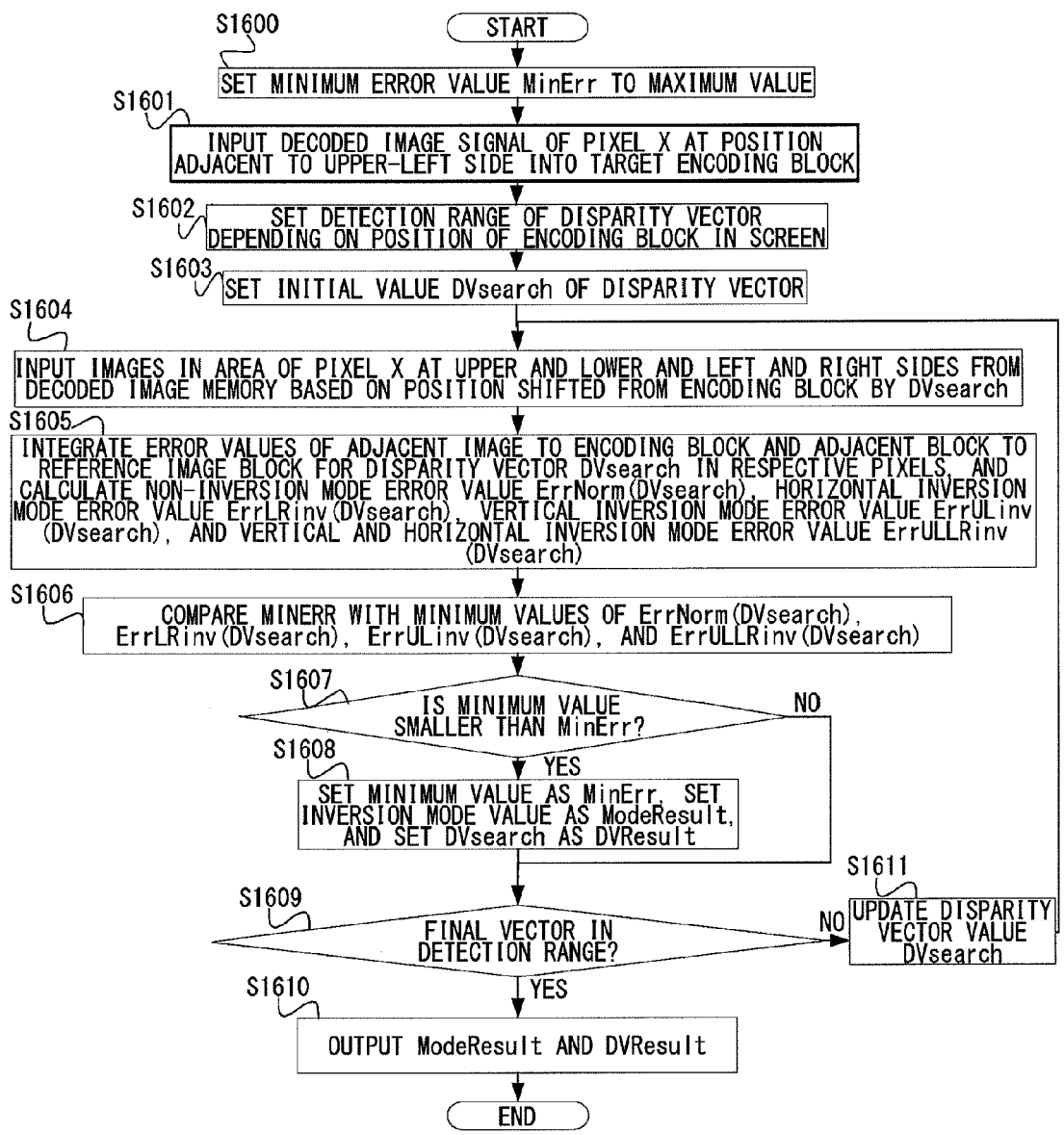
FIG. 16 is a flowchart illustrating a neighboring decoding reference disparity vector estimation operation according to the third embodiment of the present invention.

A sequence as calculation processing of the detection processing is illustrated through a flowchart in FIG. 16 and a processing sequence managed by the sequence unit 1500 will be described.

In step S1600, first, the minimum error value MinErr is set as a maximum value with respect to a target encoding block. In step S1601, the decoded image signal of the position adjacent to a pixel X is inputted into the upper-left side of the target encoding block. In step S1602, a detection range of the disparity vector is set depending on the position of the encoding block in the screen. In step S1603, an initial value DVSearch of the disparity vector is set based on the limited detection range. In step S1604, with respect to the set DVSearch, images in an area of the pixel X at upper and lower and left and right sides are inputted from the decoded image memory based on the position shifted from the encoding block by the DVsearch.

In step S1605, error values of an adjacent image to the encoding block and an adjacent block to the reference image block for the disparity vector DVSearch in respective pixels are integrated, and a non-inversion mode error value ErrNorm (DVSearch), a horizontal inversion mode error value ErrLRinv(DVSearch), a vertical inversion mode error value ErrULinv(DVSearch), and a vertical and horizontal inversion mode error value ErrULLRinv(DVSearch) are calculated.

In step S1606, minimum values of the generated ErrNorm (DVSearch), ErrLRinv(DVSearch), ErrULinv(DVSearch), and ErrULLRinv(DVSearch) are compared with the received MinErr. If the minimum value is smaller than MinErr (YES in step S1607), the minimum value is set to MinErr, the estimated inversion mode value having the minimum value is stored in ModeResult and in this case, the estimated disparity vector value DVSearch is stored in DVResult, in step S1608. If the minimum value is not smaller than MinErr (NO in step S1607), the process just proceeds to step S1609.

If the disparity vector value subjected to the error value calculation is a final vector in the vector value (YES in step S1609), ModeResult and DVResult are outputted in step S1610 and the process ends. If the disparity vector value is not the final vector (NO in step S1609), the disparity vector value DVSearch is updated at a subsequent detection position in step S1611 and the process proceeds back to step S1604.

According to the processing sequence, the neighboring decoding reference disparity vector estimation unit 1225 in FIG. 12 and the neighboring decoding reference disparity vector estimation unit 1318 in FIG. 13 generate the estimated disparity vector value DVResult and the estimated inversion mode value ModeResult.

These values may be used as the prediction disparity vector value and the prediction inversion mode value in the disparity vector detection unit 703, and in the case where estimation from the adjacent image is effectively functioned, the additional information required for disparity prediction using detection of the disparity vector may be reduced.

The neighboring decoding reference disparity prediction signal generation unit 1226 in FIG. 12 and neighboring decoding reference disparity prediction signal generation unit 1319 in FIG. 13 acquire the encoded decoding image at the position shifted from the encoding target block by the disparity vector value as the reference image, from the in-frame decoded image memories 111 and 208, based on the disparity vector value DVResult inputted from the neighboring decoding reference disparity vector estimation units 1225 and 1318 and the estimated inversion mode value ModeResult. The acquired reference image configures the prediction image block by replacing horizontal and vertical arrangement sequences depending on the inversion mode. The configured prediction image block is supplied to the mode judgment unit 724 in FIG. 12 and the prediction signal selection unit 811 in FIG. 13, and used as the prediction image block in the case where the configured prediction image block is selected as the prediction mode.

Conventionally, estimation of the neighboring decoding reference disparity vector of performing error evaluation of the adjacent part to the image referred as the disparity vector is performed by using the encoded decoding image adjacent to the encoding target block. In the third embodiment of the present invention, error evaluation in the adjacent part in the case of inverting the decoded image vertically and horizontally is performed and thereby the disparity vector and the inversion mode are estimated. By generating the prediction signal with the estimated information, prediction precision may be improved without needing the additional information compared to the conventional estimation of the neighboring decoding reference vector.

Fourth Embodiment

Forms of an image encoding device and an image decoding device according to a fourth embodiment of the present invention will be described. The fourth embodiment is an embodiment having a configuration of calculating the inversion mode without transmitting a code by performing evaluation using the adjacent image of the encoding target block as the template, with respect to the configuration of the second embodiment.

Figure 17:
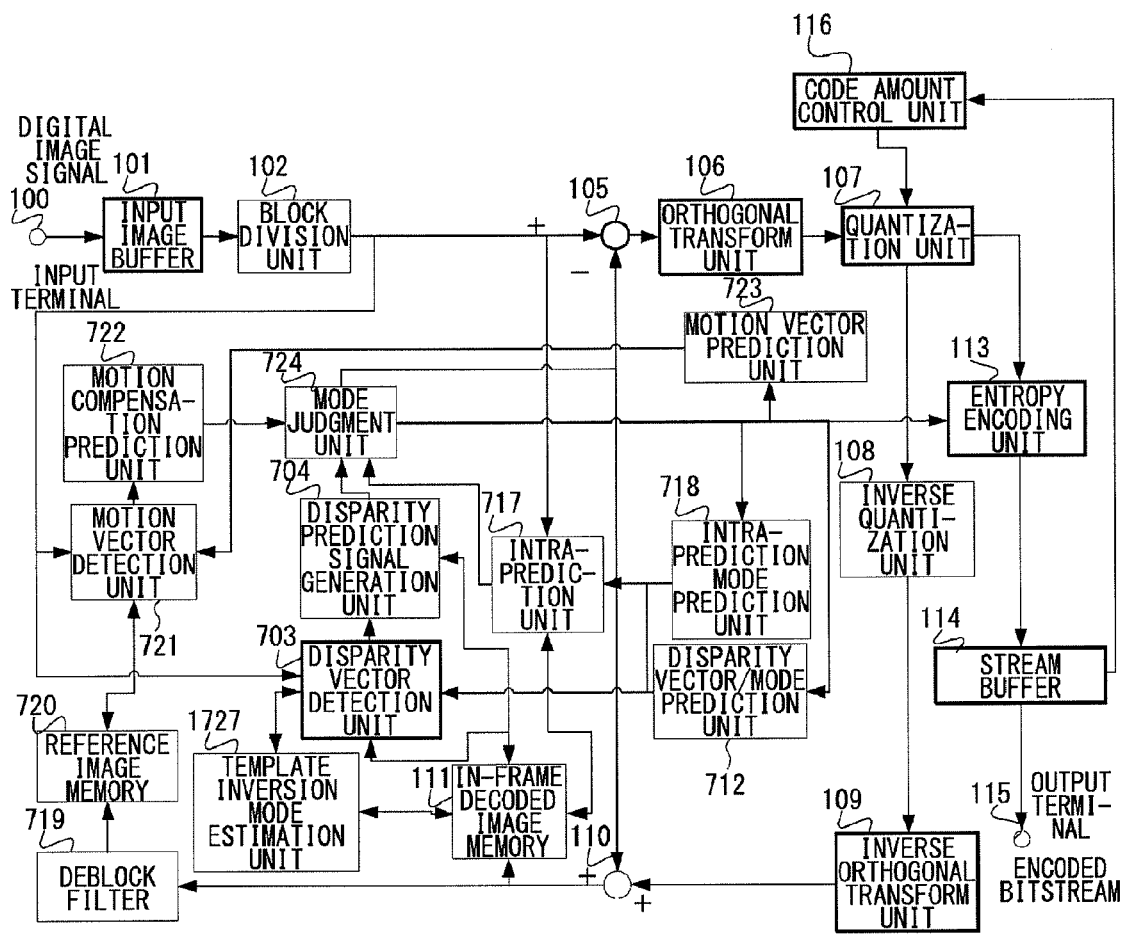
FIG. 17 is a configuration diagram illustrating an image encoding device according to a fourth embodiment of the present invention.
Figure 18:
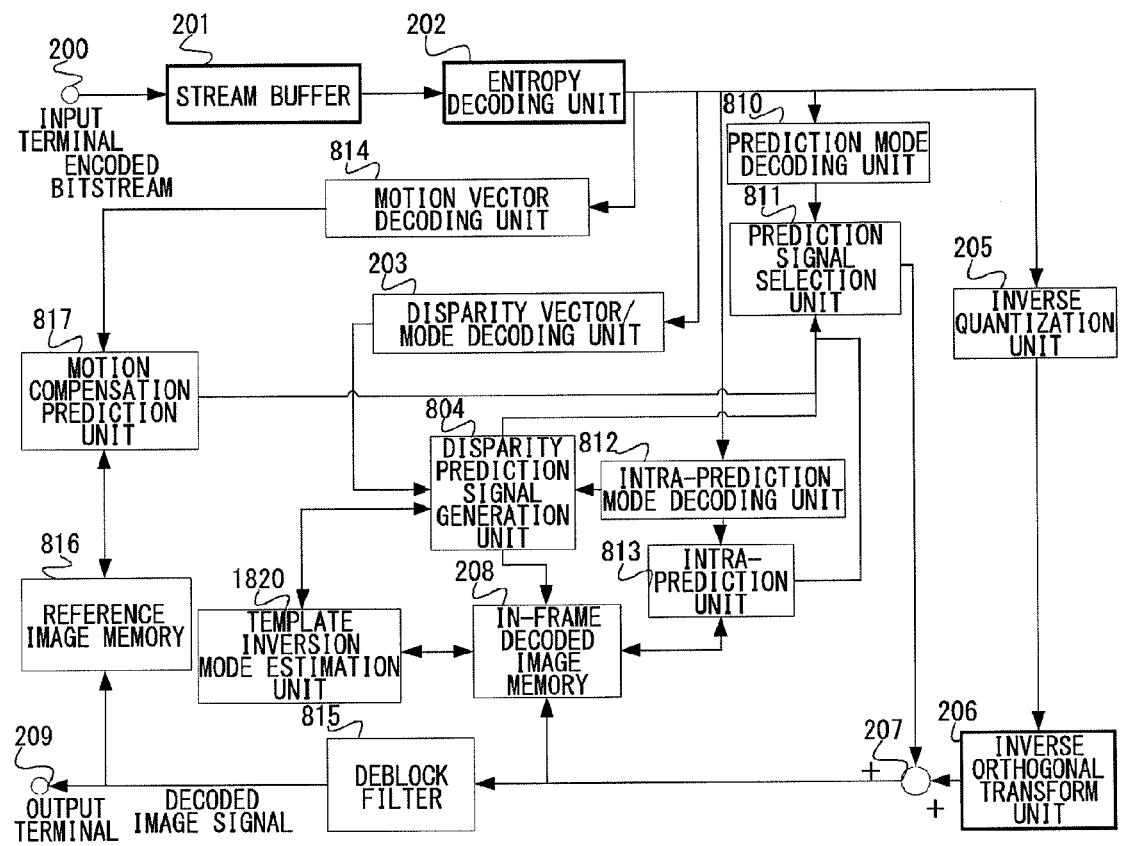
FIG. 18 is a configuration diagram illustrating an image decoding device according to the fourth embodiment of the present invention.

FIG. 17 is a configuration diagram of the image encoding device according to the fourth embodiment and FIG. 18 is a configuration diagram of the image decoding device according to the fourth embodiment, and operations thereof will be described.

As illustrated in FIG. 17, the image encoding device according to the embodiment further includes a template inversion mode estimation unit 1727 in addition to the processing blocks having the same functions as those in the second embodiment, and as illustrated in FIG. 18, the image decoding device according to the embodiment further includes a template inversion mode estimation unit 1820 in addition to the processing blocks having the same functions as those in the second embodiment.

The template inversion mode estimation unit 1820 is configured to calculate an appropriate inversion mode by using the adjacent image of the encoding target block as the template with respect to the set disparity vector. Since the processing blocks in the encoding device and the processing blocks in the decoding device have the same function as each other, detailed operations thereof will be further described.

In the case of the encoding device, the disparity vector as the target is inputted from the disparity vector detection unit 703 into the template inversion mode estimation unit 1727 and in the case of the decoding device, the decoded disparity vector is inputted from the disparity prediction signal generation unit 804 into the template inversion mode estimation unit 1820.

Figure 19:
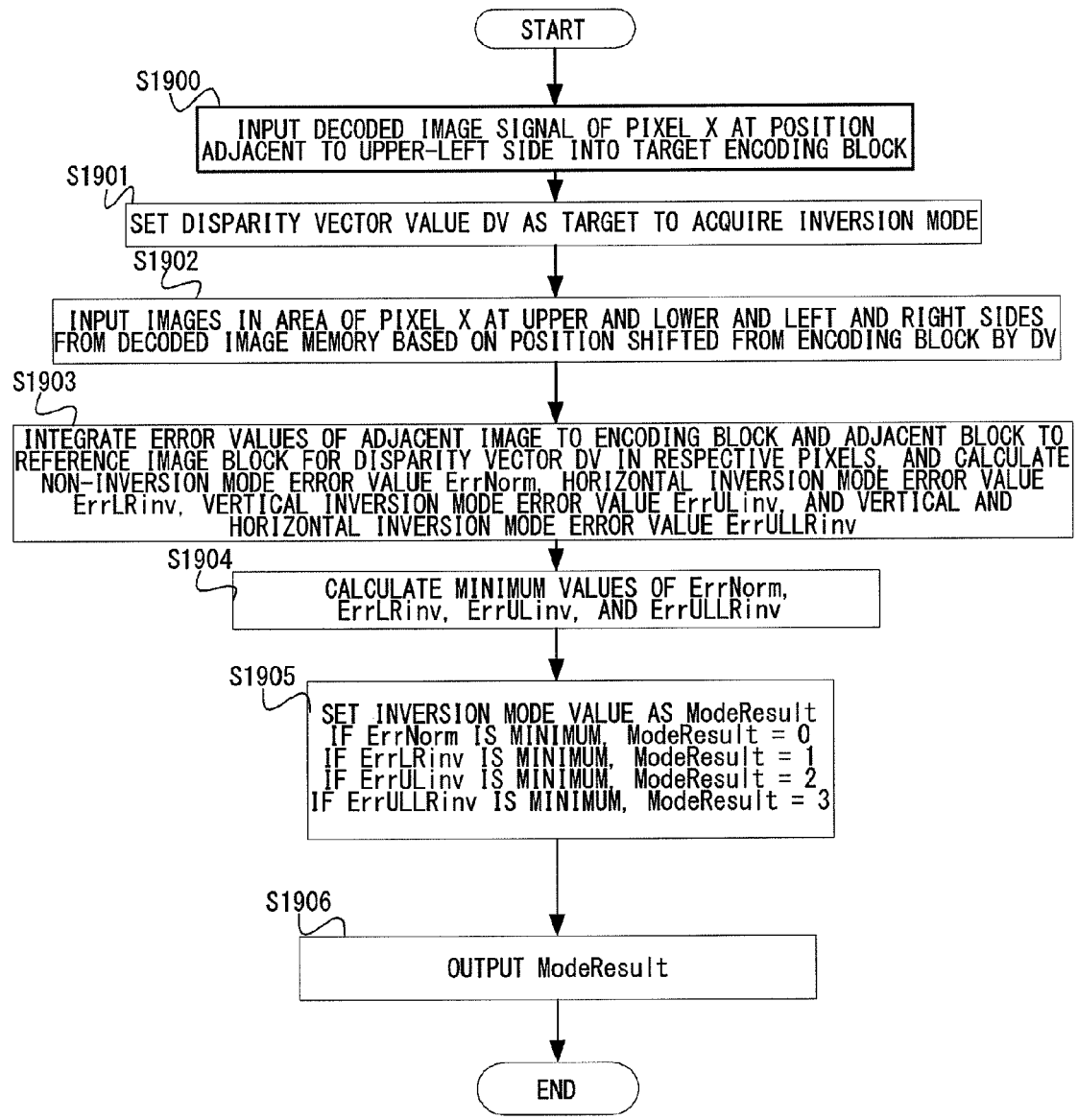
FIG. 19 is a flowchart illustrating an inversion mode estimation operation according to the fourth embodiment of the present invention.
Figure 20:
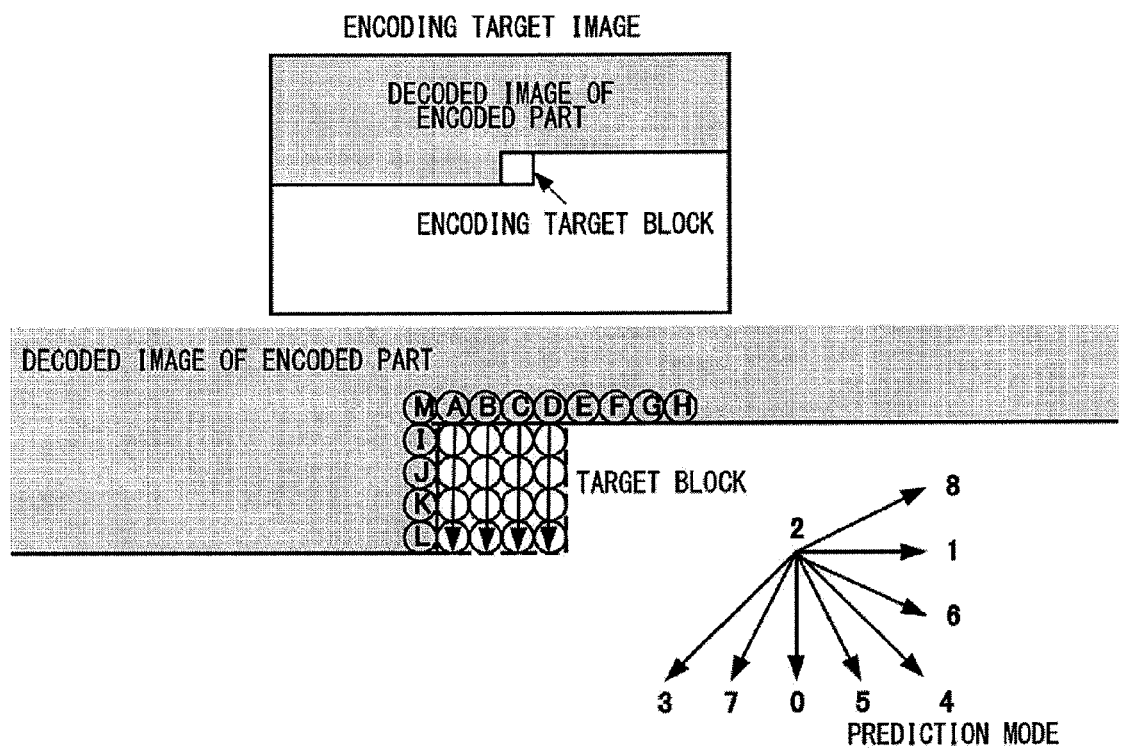
FIG. 20 is a conceptual diagram illustrating intra-prediction in the related art.
Figure 21:
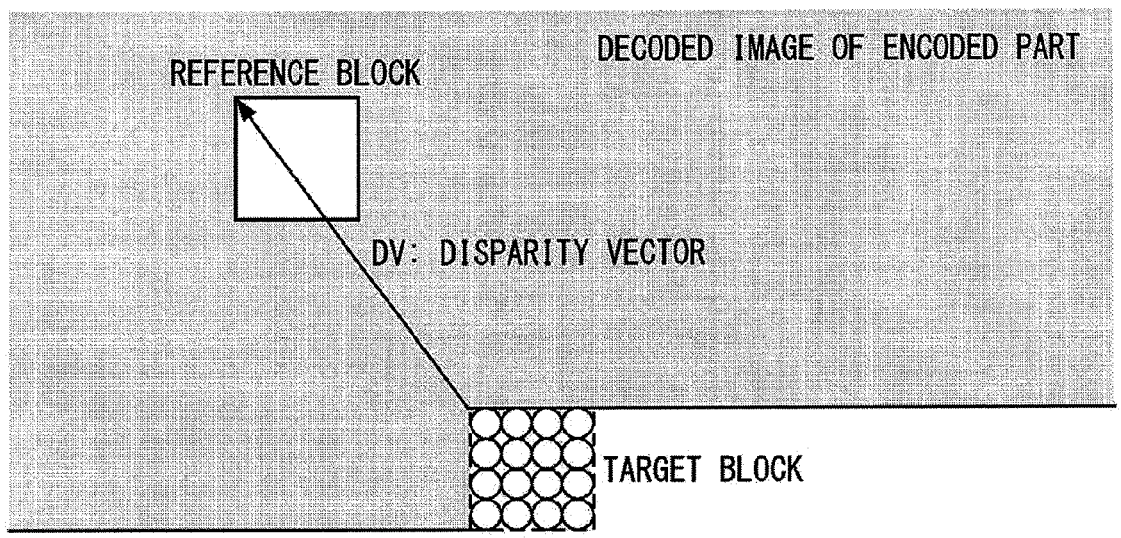
FIG. 21 is a conceptual view illustrating prediction of a disparity within a screen in the related art.

The template inversion mode estimation units 1727 and 1820 serve to select the inversion mode by using the disparity vector and the decoded images inputted from the in-frame decoded image memories 111 and 208. A flow of inversion mode estimation processing will be described by using a flowchart of FIG. 19.

In step S1900, the decoded image signal of pixel X at the position adjacent to the upper-left side is first inputted into the target encoding block. In step S1901, a disparity vector value DV as a target to acquire the inversion mode is set. In step S1902, with respect to the set DV, images in the area of the pixel X at the upper and lower and left and right sides are inputted from the decoded image memory based on the position shifted from the encoding block by the DV.

In step S1903, error values of an adjacent image to the encoding block and an adjacent block to the reference image block for the disparity vector DV in the respective pixels are integrated, and a non-inversion mode error value ErrNorm, a horizontal inversion mode error value ErrLRinv, a vertical inversion mode error value ErrULinv, and a vertical and horizontal inversion mode error value ErrULLRinv are calculated.

In step S1904, a minimum value among the generated ErrNorm, ErrLRinv, ErrULinv, and ErrULLRinv is calculated. In step S1905, when the minimum value is the ErrNorm, the estimated inversion mode value is set to 0 in the ModeResult, when the minimum value is ErrLRinv, the estimated inversion mode value is set to 1 in the ModeResult, when the minimum value is the ErrULinv, the estimated inversion mode value is set to 2 in the ModeResult, and when the minimum value is the ErrULLRinv, the estimated inversion mode value is set to 3 in the ModeResult.

In step S1906, the calculated ModeResult is outputted and the inversion mode value for the encoding target block is calculated.

The prediction signal is generated by using the calculated ModeResult as the inversion mode value as it is to confirm the inversion mode without additional information, and the same processing is performed in the decoding device to restore the inversion mode value.

The calculated ModeResult may be used as the prediction inversion mode value of the disparity vector detection unit 703 in the encoding device, and when estimation from the adjacent image is effectively functioned, inversion mode information in disparity prediction using detection of the disparity vector may be reduced.

In the fourth embodiment of the present invention, the inversion mode is estimated by performing error evaluation of an adjacent part at a position by inverting the position of the adjacent part of the decoded image referred as the disparity vector vertically and horizontally based on the decoded image referred as the disparity vector by using the encoded decoding image adjacent to the encoding target block and the prediction signal is generated by using the inversion mode which is an estimation result to improve prediction efficiency of in-frame disparity prediction using the correlation of the texture component without increasing the additional information, thereby improving encoding efficiency.

The image encoding devices and the image decoding devices presented as the first, second, third, and fourth embodiments can be physically implemented by a CPU (central processing unit), a recording device such as a memory, a display device such as a display, and a communication means on a transmission path and implemented by executing modules having the respective presented functions with the computer.

EXPLANATION OF REFERENCE NUMERALS 100 input terminal
101 input image buffer
102 block division unit
103 disparity vector detection unit
104 disparity prediction signal generation unit
105 subtractor
106 orthogonal transform unit
107 quantization unit
108 inverse quantization unit
109 inverse orthogonal transform unit
110 adder
111 in-frame decoded image memory
112 disparity vector/mode prediction unit
113 entropy encoding unit
114 stream buffer
115 output terminal
116 code amount control unit
200 input terminal
201 stream buffer
202 entropy decoding unit
203 disparity vector/mode decoding unit
204 disparity prediction signal generation unit
205 inverse quantization unit
206 inverse orthogonal transform unit
207 adder
208 in-frame decoded image memory
209 output terminal
400 sequence unit
401 target image buffer
402 mode prediction value disparity vector prediction value buffer
403 memory access unit
404 disparity reference image buffer
405 non-inversion mode error calculation unit
406 horizontal inversion mode error calculation unit
407 vertical inversion mode error calculation unit
408 vertical and horizontal inversion mode error calculation unit
409 optimal disparity vector updating unit
410 mode difference disparity vector difference calculator
411 optimal vector/evaluation value storing unit
703 disparity vector detection unit
704 disparity prediction signal generation unit
717 intra-prediction unit
718 intra-prediction mode prediction unit
719 deblock filter
720 reference image memory
721 motion vector detection unit
722 motion compensation prediction unit
723 motion vector prediction unit
724 mode judgment unit
804 disparity prediction signal generation unit
810 prediction mode decoding unit
811 prediction signal selection unit
812 intra-prediction mode decoding unit
813 intra-prediction unit
814 motion vector decoding unit
815 deblock filter
816 reference image memory
817 motion compensation prediction unit
905 non-inversion mode error calculator
906 horizontal inversion mode error calculator
907 vertical inversion mode error calculator
908 vertical and horizontal inversion mode error calculation unit
913 disparity reference dc calculation unit
914 intra-prediction dc calculation unit
1225 neighboring decoding reference disparity vector estimation unit
1226 neighboring decoding reference disparity prediction signal generation unit
1318 neighboring decoding reference disparity vector estimation unit
1319 neighboring decoding reference disparity prediction signal generation unit
1500 sequence unit
1501 memory access unit
1502 neighboring decoded image buffer
1503 disparity reference image buffer
1504 non-inversion mode error calculation unit
1505 horizontal inversion mode error calculation unit
1506 vertical inversion mode error calculation unit
1507 vertical and horizontal inversion mode error calculation unit
1508 optimal estimated disparity vector updating unit
1509 optimal estimated vector/evaluation value storing unit
1727 template inversion mode estimation unit
1820 template inversion mode estimation unit The present invention can be used for a technique for encoding and decoding the image signal.

What is claimed is:
1. An image encoding device dividing an image signal into a block constituted by a plurality of pixels and encoding the image signal by the divided block units, comprising:
a disparity vector detection unit operative to retrieve a signal having a high correlation with an encoding target block and acquire the signal having the high correlation and a disparity vector which is a disparity within a screen of the encoding target block by using a local decoded image of a block within the same image signal which has already been encoded with respect to the encoding target block; and a disparity prediction signal generation unit operative to generate a prediction signal in accordance with the disparity vector, wherein the disparity vector detection unit includes a DC calculation unit operative to predict a DC component of an image signal of the encoding target block from a neighboring decoded image, and a disparity reference DC calculation unit operative to calculate a DC component of a prediction signal represented by the disparity vector, and compensates a difference between the DC component predicted from the neighboring decoded image and the DC component of the prediction signal, adds the compensated prediction signal to a selection candidate of the prediction signal of the encoding target block, and detects an appropriate signal among the prediction signals and a disparity vector required to configure the prediction signal and information indicating whether the DC component is compensated, and the disparity prediction signal generation unit generates a prediction signal from the local decoded image in accordance with the detected disparity vector and the information indicating whether the DC component is compensated, which are detected, and encodes a difference signal between the generated prediction signal and the encoding target block which are generated, the disparity vector, and the information indicating whether the DC component is compensated.

2. The image encoding device according to claim 1, wherein the disparity vector detection unit calculates a signal acquired by inverting a prediction signal designated in the disparity vector in at least one of horizontal and vertical directions, adds the inverted prediction signal to the selection candidate of the prediction signal of the encoding target block, and detects information indicating an inversion direction, and the disparity prediction signal generation unit generates the prediction signal from the local decoded image in accordance with the detected disparity vector and the information indicting the inversion direction and encodes the difference signal between the generated prediction signal and the encoding target block, the disparity vector, the information indicating whether the DC component is compensated, and the information indicating the inversion direction.

3. An image encoding device of dividing an image signal into a block constituted by a plurality of pixels and encoding the image signal by the divided block units, comprising:

a neighboring decoding reference disparity vector estimation unit operative to acquire a disparity vector which is a disparity in a screen between an encoding target block and a prediction signal generated from a local decoded image by using the local decoded image of a block in the same image signal which was previously encoded, with respect to the encoding target block; and a neighboring decoding reference disparity prediction signal generation unit operative to generate a prediction signal in accordance with the disparity vector, wherein the neighboring decoding reference disparity vector estimation unit generates the prediction signal and the disparity vector by evaluating an error between signals of adjacent parts of a local decoded image adjacent to the encoding target block and a local decoded image referred as the disparity vector, and generates information indicating an inversion direction by evaluating an error between the local decoded image adjacent to the encoding target block and a signal at a position by inverting the position of the adjacent part of the local decoded image referred as the disparity vector into an arrangement in at least one direction of horizontal and vertical directions based on the local decoded image referred as the disparity vector, and the neighboring decoding reference disparity prediction signal generation unit generates a prediction signal from the local decoded image in accordance with the disparity vector and the information indicating the inversion direction, and encodes a difference signal between the prediction signal and the encoding target block.

4. An image encoding device of dividing an image signal into a block constituted by a plurality of pixels and encoding the image signal by the divided block units, comprising:

a disparity vector detection unit operative to retrieve a signal having a high correlation with an encoding target block and acquire the signal having the high correlation and a disparity vector which is a disparity in a screen of the encoding target block by using a local decoded image of a block in the same image signal which was previously encoded, with respect to the encoding target block;

a disparity prediction signal generation unit operative to generate a prediction signal in accordance with the disparity vector; and a template inversion mode estimation unit operative to estimate information indicating an inversion direction for inverting the prediction signal in at least one direction of horizontal and vertical directions, wherein the template inversion mode estimation unit generates information indicating an inversion direction by evaluating an error between the local decoded image adjacent to the encoding target block and a signal at a position by inverting the position of the adjacent part of the local decoded image referred as the disparity vector into an arrangement in at least one direction of horizontal and vertical directions based on the local decoded image referred as the disparity vector, the disparity vector detection unit calculates a signal acquired by inverting a prediction signal designated in the disparity vector in accordance with the information indicating the inversion direction and detects the disparity vector by evaluating an error between the prediction signal and the encoding target block for each disparity vector, and the disparity prediction signal generation unit generates the prediction signal from the local decoded image in accordance with the disparity vector and the information indicating the inversion direction and encodes a difference signal between the prediction signal and the encoding target block and the disparity vector.

5. An image decoding device dividing an image signal into a block constituted by a plurality of pixels, and receiving and decoding an encoded stream subjected to encoding by the divided block units, comprising:

a disparity vector/mode decoding unit operative to decode a prediction signal generated from a block within the same image signal which has already been decoded with respect to a decoding target block from the encoded stream, a disparity vector which is a disparity within a screen from the decoding target block; and a disparity prediction signal generation unit operative to generate a prediction signal from the decoded image in accordance with the disparity vector, wherein the disparity prediction signal generation unit includes a DC calculation unit operative to predict a DC component of an image signal of a decoding target block from a neighboring decoded image, and a disparity reference DC calculation unit operative to calculate a DC component of the prediction signal represented by the disparity vector, and decodes whether or not to compensate the DC component, compensates a difference between the DC component predicted from the neighboring decoded image and the DC component of the prediction signal when compensation is performed based on the decoded information, generates a compensated prediction signal, and calculates the decoded image by adding the generated prediction signal to the decoded residual signal.

6. The image decoding device according to claim 5, wherein the disparity vector/mode decoding unit decodes a prediction signal generated from a block within the same image signal which was previously decoded with respect to a decoding target block from the encoded stream, a disparity vector which is a disparity within a screen from the decoding target block, and information indicating an inversion direction to invert the decoded image designated in the disparity vector in at least one direction of horizontal and vertical directions, and the disparity prediction signal generation unit generates a prediction signal in accordance with information indicating whether the DC component is compensated by using the decoded image acquired in accordance with the disparity vector and the information indicating the inversion direction.

7. An image decoding device of dividing an image signal into a block constituted by a plurality of pixels, and receiving and decoding an encoded stream subjected to encoding by the divided block units, comprising:

a neighboring decoding reference disparity vector estimation unit operative to a disparity vector which is a disparity in a screen between the decoding target block and a prediction signal generated from the decoded image by using a decoded image of a block in the same image signal which was previously decoded with respect to the decoding target block; and a neighboring decoding reference disparity prediction signal generation unit operative to generate a prediction signal in accordance with the disparity vector, wherein the neighboring decoding reference disparity vector estimation unit generates the prediction signal and the disparity vector by evaluating an error between signals of adjacent parts of a decoded image adjacent to the decoding target block and a decoded image referred as the disparity vector, and generates information indicating an inversion direction by evaluating an error between the decoded image adjacent to the decoding target block and a signal at a position by inverting the position of the adjacent part of the decoded image referred as the disparity vector into an arrangement in at least one direction of horizontal and vertical directions based on the decoded image referred as the disparity vector, and the neighboring decoding reference disparity prediction signal generation unit generates a prediction signal from the decoded image in accordance with the disparity vector and the information indicating the inversion direction and calculates a decoded image by adding the prediction signal and a decoded residual signal to each other.

8. An image decoding device of dividing an image signal into a block constituted by a plurality of pixels, and receiving and decoding an encoded stream subjected to encoding by the divided block units, comprising:

a disparity vector/mode decoding unit operative to decode a prediction signal generated from a block in the same image signal which was previously decoded with respect to a decoding target block and a disparity vector which is a disparity in a screen from the decoding target block; and a template inversion mode estimation unit operative to estimate information indicating an inversion direction for inverting the prediction signal in at least one direction of horizontal and vertical directions, wherein the template inversion mode estimation unit generates information indicating an inversion direction by evaluating an error between the decoded image adjacent to the decoding target block and a signal at a position by inverting the position of the adjacent part of the decoded image referred as the disparity vector into an arrangement in at least one direction of horizontal and vertical directions based on the decoded image referred as the disparity vector; and a disparity prediction signal generation unit operative to generate a prediction signal from the local decoded image in accordance with the disparity vector and the information indicating the inversion direction, wherein the disparity prediction signal generation unit calculates a decoded image by adding the prediction signal and a decoded residual signal to each other.

9. An image encoding method dividing an image signal into a block constituted by a plurality of pixels and encoding the image signal by the divided block units, comprising:

a disparity vector detection step operative to retrieve a signal having a high correlation with an encoding target block and acquire the signal having the high correlation and a disparity vector which is a disparity within a screen of the encoding target block by using a local decoded image of a block within the same image signal which has already been encoded with respect to the encoding target block; and a disparity prediction signal generation step operative to generate a prediction signal in accordance with the disparity vector, wherein in the disparity vector detection step, a DC calculation unit operative to predict a DC component of an image signal of the encoding target block from a neighboring decoded image, and a disparity reference DC calculation unit operative to calculate a DC component of a prediction signal represented by the disparity vector are provided, and a difference between the DC component predicted from the neighboring decoded image and the DC component of the prediction signal is compensated, the compensated prediction signal is added to a selection candidate of the prediction signal of the encoding target block, and an appropriate signal is detected among the prediction signals and a disparity vector required to configure the prediction signal and information indicating whether the DC component is compensated are detected, and in the disparity prediction signal generation step, a prediction signal is generated from the local decoded image in accordance with the detected disparity vector and the information indicating whether the DC component is compensated, and a difference signal between the generated prediction signal and the encoding target block, the disparity vector, and the information indicating whether the DC component is compensated.

10. An image encoding method of dividing an image signal into a block constituted by a plurality of pixels and encoding the image signal by the divided block units, comprising:
- a neighboring decoding reference disparity vector estimation step operative to acquire a disparity vector which is a disparity in a screen between the an encoding target block and a prediction signal generated from a local decoded image by using the local decoded image of a block which was previously encoded with respect to the encoding target block; and
- a neighboring decoding reference disparity prediction signal generation step operative to generate a prediction signal in accordance with the disparity vector, wherein
- in the neighboring decoding reference disparity vector estimation step, the prediction signal and the disparity vector is generated by evaluating an error between signals of adjacent parts of a local decoded image adjacent to the encoding target block and a local decoded image referred as the disparity vector, and information indicating an inversion direction is generated by evaluating an error between the local decoded image adjacent to the encoding target block and a signal at a position by inverting the position of the adjacent part of the local decoded image referred as the disparity vector into an arrangement in at least one direction of horizontal and vertical directions based on the local decoded image referred as the disparity vector, and
- in the neighboring decoding reference disparity prediction signal generation step, a prediction signal from the local decoded image is generated in accordance with the disparity vector and the information indicating the inversion direction, and a difference signal between the prediction signal and the encoding target block is encoded.

11. An image encoding method of dividing an image signal into a block constituted by a plurality of pixels and encoding the image signal by the divided block units, comprising:
- a disparity vector detection step operative to retrieve a signal having a high correlation with an encoding target block and acquire the signal having the high correlation and a disparity vector which is a disparity in a screen of the encoding target block by using a local decoded image of a block in the same image signal which was previously encoded with respect to the encoding target block;
- a disparity prediction signal generation step operative to generate a prediction signal in accordance with the disparity vector; and
- a template inversion mode estimation step operative to estimate information indicating an inversion direction for inverting the prediction signal in at least one direction of horizontal and vertical directions, wherein
- in the template inversion mode estimation step, information indicating an inversion direction is generated by evaluating an error between the local decoded image adjacent to the encoding target block and a signal at a position by inverting the position of the adjacent part of the local decoded image referred as the disparity vector into an arrangement in at least one direction of horizontal and vertical directions based on the local decoded image referred as the disparity vector,
- in the disparity vector detection step, a signal acquired by inverting a prediction signal designated in the disparity vector is calculated in accordance with the information indicating the inversion direction, and the disparity vector is detected by evaluating an error between the prediction signal and the encoding target block for each disparity vector, and
- in the disparity prediction signal generation step, the prediction signal from the local decoded image is generated in accordance with the disparity vector and the information indicating the inversion direction, and a difference signal between the prediction signal and the encoding target block and the disparity vector and the information indicating the inversion direction is encoded.

12. An image decoding method dividing an image signal into a block constituted by a plurality of pixels, and receiving and decoding an encoded stream subjected to encoding by the divided block units, comprising:
- a disparity vector/mode decoding step operative to decode a prediction signal generated from a block within the same image signal which has already been decoded with respect to a decoding target block from the encoded stream, a disparity vector which is a disparity within a screen from the decoding target block; and
- a disparity prediction signal generation step operative to generate a prediction signal from the decoded image in accordance with the disparity vector, wherein
- in the disparity prediction signal generation step, a DC calculation unit operative to predict a DC component of an image signal of a decoding target block from a neighboring decoded image, and a disparity reference DC calculation unit operative to calculate a DC component of the prediction signal represented by the disparity vector are provided, information indicating whether or not to compensate the DC component is decoded, a difference between the DC component predicted from the neighboring decoded image and the DC component of the prediction signal when compensation is performed based on the decoded information is compensated, a compensated prediction signal is generated, and the decoded image is calculated by adding the generated prediction signal to the decoded residual signal.

13. An image decoding method of dividing an image signal into a block constituted by a plurality of pixels, and receiving and decoding an encoded stream subjected to encoding by the divided block units, comprising:
- a neighboring decoding reference disparity vector estimation step operative to acquire a disparity vector which is a disparity in a screen between the decoding target block and a prediction signal generated from the decoded image by using a decoded image of a block in the same image signal which was previously decoded with respect to the decoding target block; and
- a neighboring decoding reference disparity prediction signal generation step operative to generate a prediction signal in accordance with the disparity vector, wherein
- in the neighboring decoding reference disparity vector estimation step, the prediction signal and the disparity vector are generated by evaluating an error between signals of adjacent parts of a decoded image adjacent to the decoding target block and a decoded image referred as the disparity vector, and information indicating an inversion direction is generated by evaluating an error between the decoded image adjacent to the decoding target block and a signal at a position by inverting the position of the adjacent part of the decoded image referred as the disparity vector into an arrangement in at least one direction of horizontal and vertical directions based on the decoded image referred as the disparity vector, and
- in the neighboring decoding reference disparity prediction signal generation step, a prediction signal is generated from the decoded image in accordance with the disparity vector and the information indicating the inversion direction, and a decoded image is calculated by adding the prediction signal and a decoded residual signal to each other.

14. An image decoding method of dividing an image signal into a block constituted by a plurality of pixels, and receiving and decoding an encoded stream subjected to encoding by the divided block units, comprising:

a disparity vector/mode decoding step operative to decode a prediction signal generated from a block in the same image signal which was previously decoded with respect to a decoding target block, and a disparity vector which is a disparity in a screen from the decoding target block;

a template inversion mode estimation step operative to estimate information indicating an inversion direction for inverting the prediction signal in at least one direction of horizontal and vertical directions, wherein in the template inversion mode estimation step, information indicating an inversion direction is generated by evaluating an error between the decoded image adjacent to the decoding target block and a signal at a position by inverting the position of the adjacent part of the decoded image referred as the disparity vector into an arrangement in at least one direction of horizontal and vertical directions based on the decoded image referred as the disparity vector; and a disparity prediction signal generation step operative to generate a prediction signal from the local decoded image in accordance with the disparity vector and the information indicating the inversion direction, wherein in the disparity prediction signal generation step, a decoded image is calculated by adding the prediction signal and a decoded residual signal to each other.

* * * * *